(12) United States Patent
Rorke et al.

(10) Patent No.: US 9,380,760 B2
(45) Date of Patent: Jul. 5, 2016

(54) FOLDING PET RAMP AND STEPS DEVICE WITH TELESCOPING HANDLE

(71) Applicant: PetEdge, Inc., Beverly, MA (US)

(72) Inventors: Brooks Rorke, Guilford, CT (US); Lori Haraske, Amesbury, MA (US)

(73) Assignee: PetEdge, Inc., Beverly, MA (US)

( * ) Notice: Subject to any disclaimer, the term of this patent is extended or adjusted under 35 U.S.C. 154(b) by 9 days.

(21) Appl. No.: 13/667,460

(22) Filed: Nov. 2, 2012

(65) Prior Publication Data

US 2014/0123910 A1    May 8, 2014

(51) Int. Cl.
*A01K 1/035*    (2006.01)

(52) U.S. Cl.
CPC ...................... *A01K 1/035* (2013.01)

(58) Field of Classification Search
CPC ..... A01K 1/035; A01K 29/00; A01K 1/0107; B65G 69/30; E04F 2011/005; E04F 11/06; E04F 11/04; E04F 11/062; E04F 11/068; E06C 1/36; E06C 1/38; E06C 1/3835; E06C 1/12; B63B 27/14; B63B 2027/141; B60R 3/007
USPC .......... 119/847, 849; 182/1, 93, 95, 156, 207, 182/209
IPC ....................................................... A01K 29/00
See application file for complete search history.

(56) References Cited

U.S. PATENT DOCUMENTS

| | | | |
|---|---|---|---|
| 720,891 A * | 2/1903 | Chamberlain | E06C 1/387 182/156 |
| 1,791,330 A * | 2/1931 | Sprague | 182/21 |
| D184,655 S * | 3/1959 | Baer | D25/63 |
| 3,446,311 A * | 5/1969 | Alfie | E06C 1/387 182/116 |
| 4,723,631 A * | 2/1988 | Tremblay | E06C 1/387 182/106 |
| 4,757,876 A * | 7/1988 | Peacock | 182/95 |
| 5,224,723 A | 7/1993 | Hatas | |
| 5,277,436 A * | 1/1994 | Frank et al. | 280/5.2 |
| D359,134 S * | 6/1995 | Toews | D25/64 |
| 5,454,196 A | 10/1995 | Gaines et al. | |
| 5,592,801 A | 1/1997 | Balzer | |
| 5,634,440 A | 6/1997 | Mogck | |
| 5,704,448 A * | 1/1998 | Jenkins, Jr. | 182/93 |
| 5,941,195 A * | 8/1999 | Martz | 119/497 |
| 5,941,342 A | 8/1999 | Lee | |
| 6,012,548 A * | 1/2000 | Kim | E06C 1/387 182/156 |
| 6,119,634 A | 9/2000 | Myrick | |
| 6,189,653 B1 | 2/2001 | Laug | |
| 6,450,290 B1 * | 9/2002 | Spak | E06C 1/387 182/156 |
| 6,764,123 B1 | 7/2004 | Bilyard | |
| 6,983,720 B2 * | 1/2006 | Lakela | 119/165 |

(Continued)

*Primary Examiner* — Kathleen Alker
(74) *Attorney, Agent, or Firm* — McCarter & English, LLP

(57) ABSTRACT

Exemplary embodiments are directed to pet ramp/step devices and associated methods, including a frame supporting at least one platform member. The at least one platform member includes a riser and a runner which are movable between a ramp mode configuration and a step mode configuration. The frame further includes a telescoping handle which is extendable relative to the frame based on a height of the supporting structure against which the telescoping handle is positioned. The frame includes a frame hinge for folding the frame into a folded position and a frame locking mechanism for locking the frame in the folded position. The riser fixedly supports the runner against a pair of riser supports of the frame when positioned in the step mode. The runner is further supported by the pair of riser supports when positioned in the ramp mode.

25 Claims, 22 Drawing Sheets

(56) References Cited

U.S. PATENT DOCUMENTS

| | | |
|---|---|---|
| 7,159,261 B2 | 1/2007 | Carrigan |
| 7,302,725 B2 * | 12/2007 | Thygesen ............... 14/69.5 |
| 7,383,600 B2 | 6/2008 | Carrigan |
| 7,422,263 B2 * | 9/2008 | Pritchard ............... B62D 33/03 14/71.1 |
| D596,812 S | 7/2009 | Sicken et al. |
| 7,621,236 B2 * | 11/2009 | Steffey et al. ............... 119/847 |
| 7,971,395 B1 | 7/2011 | Vigil et al. |
| 8,322,490 B1 * | 12/2012 | Loemker ............... E06C 5/24 114/362 |
| 8,776,947 B1 * | 7/2014 | Wurth et al. ............... 182/1 |
| 2003/0051299 A1 | 3/2003 | Bearint |
| 2005/0056233 A1 | 3/2005 | O'Leary et al. |
| 2005/0235437 A1 | 10/2005 | Carrigan |
| 2006/0006023 A1 | 1/2006 | Lim |
| 2006/0245883 A1 | 11/2006 | Fontaine et al. |
| 2007/0101516 A1 | 5/2007 | Carrigan |
| 2009/0020360 A1 * | 1/2009 | May ............... 182/1 |
| 2009/0188444 A1 | 7/2009 | Whalen |
| 2011/0139544 A1 * | 6/2011 | Frick ............... 182/27 |
| 2011/0209672 A1 | 9/2011 | Moore, III |

\* cited by examiner

FOLDING PET RAMP AND STEPS DEVICE WITH TELESCOPING HANDLE

TECHNICAL FIELD

The present disclosure relates to an improved folding pet ramp and steps device and associated methods and, more particularly, to a pet ramp and steps device with a telescoping handle for adjustment based on applicable parameter(s), e.g., the height of a supporting structure.

BACKGROUND

Ramps and steps are used in a variety of settings to provide a means for older and/or smaller pets to, e.g., enter the trunk space and/or door of automobiles, climb onto furniture such as beds and couches, and the like. However, conventional ramps and/or steps currently available in the industry are generally solid structures which cannot be folded down for storage and/or transport and are therefore not conveniently portable and/or adaptable.

As is well known in the art, the height of, e.g., automobiles, furniture, and the like, varies greatly from vehicle to vehicle and from household to household. For example, the height of a trunk and/or tailgate of an automobile can vary greatly between a compact car and an SUV or van. In general, commercially available step structures define a height which cannot be adjusted for higher and/or lower areas which a pet desires to enter. Similarly, commercially available ramp structures generally define one length and can be implemented for entering higher areas only by increasing the ramp angle or gradient, making it more difficult and/or dangerous for pets to use.

Thus, a need exists for improved pet ramp and steps devices that may be easily and efficiently used to facilitate pet access to structures of varying height. In addition, a need exists for improved ramp and step devices that support the noted height variability while simultaneously facilitating convenient use in a step mode and a ramp mode. These and other needs are satisfied by the pet ramp/step devices and associated methods disclosed herein.

SUMMARY

In accordance with embodiments of the present disclosure, exemplary pet ramp and steps devices (hereinafter "ramp/step devices") and associated methods are disclosed that include a frame supporting at least one platform member. The at least one platform member includes a riser and a runner that is movably mounted relative to the frame so as to be movable between a ramp mode and a step mode. The exemplary pet ramp/step device can include one or more platform members, each having a riser and a runner that is movably mounted with respect to the frame so as to be movable between a ramp mode and a step mode. The frame further includes a telescoping handle.

The frame can be manufactured from, e.g., stainless steel, aluminum, carbon composite, and/or any other material suitable, and may be hollow. The frame can be positioned in a folded position for, e.g., storage, transport, and the like, and can be unfolded for use. In particular, the frame generally includes a frame hinge that facilitates folding the frame into a folded position. The frame further generally includes a frame locking mechanism, e.g., a folding rubber strap, for locking the frame in the folded position.

With respect to the at least one platform member, the runner can be movably mounted with respect to the frame by a runner hinge and the riser can be movably mounted to the runner by a riser hinge. The frame also includes a pair of riser supports for the at least one platform. The riser fixedly supports the runner against the pair of riser supports when positioned in the step mode. The runner can be supported by the pair of riser supports when positioned in the ramp mode. Further, the runner can be configured and dimensioned to receive the riser when positioned in a ramp mode. In some exemplary embodiments, the runner and the riser can include a runner/riser locking mechanism for releasably securing the riser with respect to the runner in the ramp mode. In alternative embodiments, the runner includes a runner locking mechanism for locking the runner relative to the frame in the ramp mode. The runner may include a textured surface, e.g., carpeting, rubber, and the like, to provide traction and/or comfort to the pet when using the exemplary ramp/step device.

The exemplary telescoping handle generally includes at least two hooks detachably secured to the telescoping handle with, e.g., knobs, screws, and the like, which mate with complementary apertures/holes formed in the telescoping handle. The at least two hooks function to support the frame against a structure, e.g., an inner surface and/or edge of a trunk in an automobile, during utilization of the exemplary pet ramp/step device. The telescoping handle may advantageously define a support section and a handle connection section. The handle connection section is configured and dimensioned to translate within a frame connection section. The handle connection section is thereby substantially parallel to the frame connection section. The support section of the telescoping handle can be angled relative to the handle connection section to be oriented substantially parallel to a runner positioned in the step mode. Thus, the support section can be configured and dimensioned to be positioned against a supporting structure, e.g., an inner surface of a trunk in an automobile, an automobile door, a ledge, and the like.

The telescoping handle can be extendable relative to the frame based on a height of the supporting structure. The height of the exemplary pet ramp/step can thus be adjusted for a range of heights, e.g., from about 21 inches to about 33 inches. The handle connection section further includes a handle locking mechanism configured and dimensioned to releasably secure the handle connection section with respect to the frame connection section. In particular, the handle locking mechanism can be, e.g., a spring-loaded lock button, and the frame connection section can include a plurality of apertures/holes configured and dimensioned to receive the spring-loaded lock button. In this respect, the handle locking mechanism operates as a detent mechanism.

In accordance with embodiments of the present disclosure, exemplary methods of positioning a pet ramp/step device are provided, including providing a pet ramp/step device that includes a frame, the frame including a telescoping handle and supporting at least one platform member that is movably mounted with respect to the frame so as to be movable between a ramp mode configuration and a step mode configuration. The exemplary method further includes adjusting the telescoping handle of the frame based on a height of a supporting structure, positioning the frame against the supporting structure, and positioning the at least one platform member into one of the ramp mode configuration and the step mode configuration.

In accordance with embodiments of the present disclosure, exemplary ramp/step devices are provided, including a first frame section including at least one platform member movable between a ramp mode configuration and a step mode configuration. The exemplary ramp/step devices can include a second frame section extendable from the first frame section. The at least one platform member can be movably mounted with respect to the first frame section. Further, the at least one platform can include a riser and a runner.

The second frame section can be, e.g., a handle section. The handle section can define a support section and a handle connection section. The handle connection section can be configured and dimensioned to translate within a frame connection section of the first frame section. The second frame section can be extendable relative to the first frame section based on a height of a supporting structure.

In accordance with embodiments of the present disclosure, exemplary methods of positioning a pet ramp/step device are provided, including providing a pet ramp/step device that includes a first frame section and a second frame section. The first frame section can include at least one platform member movable between a ramp mode configuration and a step mode configuration. The second frame section can be extendable from the first frame section. The exemplary method includes adjusting the extendable second frame section based on a height of a supporting structure. The exemplary method further includes positioning the second frame section against the supporting structure and positioning the at least one platform member into one of the ramp mode configuration and the step mode configuration.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed devices and associated methods, reference is made to the accompanying figures, wherein.

DESCRIPTION OF EXEMPLARY EMBODIMENTS

In accordance with embodiments of the present disclosure, exemplary ramp/step devices and associated methods are disclosed that include a frame supporting at least one platform member. The at least one platform member includes a riser and a runner which are movable between a ramp mode and a step mode. The exemplary pet ramp/step device can include one or more platform members, each having a riser and a runner movable between a ramp mode and a step mode. The frame further includes a telescoping handle.

Figure 1A:
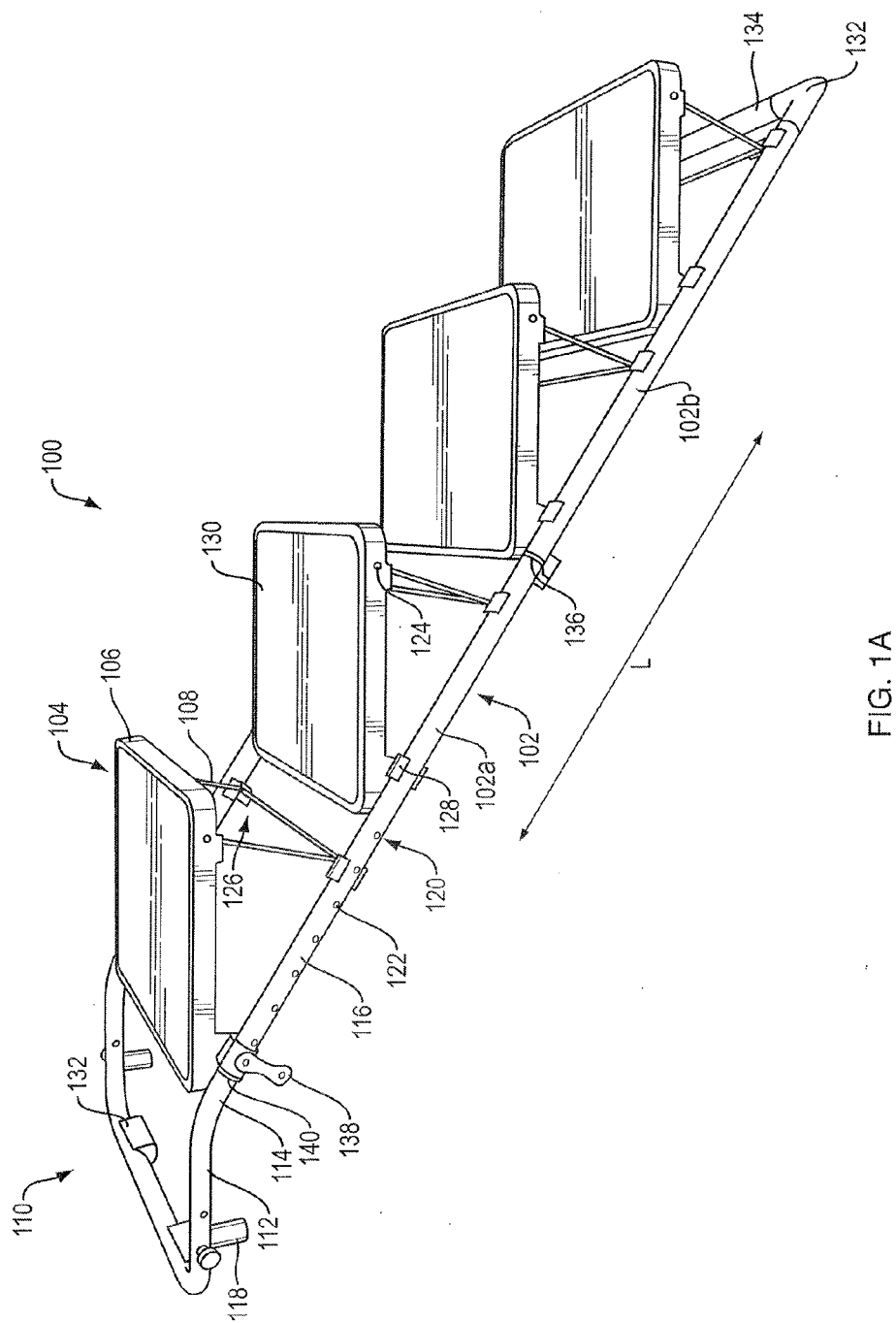
FIGS. 1A-C are perspective, side and front views of an exemplary four-platform ramp/step device in a non-extended, unfolded and step mode configuration.

With reference to FIG. 1A, an exemplary embodiment of a ramp/step device 100 is depicted in a non-extended, unfolded and step mode configuration in accordance with the present disclosure. In particular, the exemplary ramp/step device 100 extends along a longitudinal axis L defining a length of the device 100 and includes a frame 102, i.e., first and second frame sections 102a and 102b, supporting at least one platform member 104. Although illustrated with four platform members 104, in other embodiments, the ramp/step device 100 includes greater and/or less platform members 104, e.g., one, two, three, five, six, and the like. Each platform member 104 includes a runner 106 and a riser 108, which can be moved and/or configured into a ramp mode or a step mode. As would be understood by those of ordinary skill in the art, the platform members 104 of the exemplary ramp/step device 100 can be configured as a substantially continuous ramp in the ramp mode configuration and as spaced steps in the step mode configuration.

The frame 102 can be manufactured from a lightweight and/or sturdy material, e.g., stainless steel, aluminum, and/or any other suitable material, and generally defines a hollow, tubular form. Although illustrated as having a circular cross-section, in other embodiments, the frame 102 can have, e.g., a square, rectangular, and the like, cross-section. The frame 102 of the exemplary ramp/step device 100 further includes a telescoping handle 110, i.e., a frame section, which can be manufactured from, e.g., stainless steel, aluminum, and/or any other suitable material, and can be configured and dimensioned to translate within or with respect to a section of the frame 102. In particular, the telescoping handle 110 is defined by a support section 112 and a handle connection section 114. The frame 102 includes a frame connection section 116 configured and dimensioned to receive and permit the translation therein of the handle connection section 114. In particular, the handle connection section 114 is configured and dimensioned to be inserted into the frame connection section 116 at the proximal end 140 of the frame 102. It should be understood that the dimensions of the handle connection section 114 can be such that the handle connection section 114 can smoothly translate within the frame connection section 116, while preventing undesired motion, e.g., shaking, wobbling, and the like, of the handle connection section 114 within the frame connection section 116.

The connection section 114 can extend linearly along the longitudinal axis L and the support section 112 can extend at an angle away from the connection section 114 (e.g., away from the longitudinal axis L). The support section 112 can be angled relative to the handle connection section 114 so that the support section 112 is oriented substantially parallel to the runner 106 when the runner 106 is positioned in the step mode. In other embodiments, the support section 112 can be angled at a variety of angles relative to the handle connection section 114, e.g., a range of between about 5° to about 50° or about 10° to 45°. As will be discussed in greater detail below, the height and/or length of the ramp/step device 100 can thereby be adjusted by extending the telescoping handle 110, i.e., extending the handle connection section 114 from or relative to the frame connection section 116. Mating the frame 102 with the telescoping handle 110 creates a resilient and/or rigid supporting structure of the ramp/step device 100 components attached thereto, e.g., the platform members 104, and any pets utilizing the ramp/step device 100. For example, the ramp/step device 100 fabricated from tubular aluminum can typically support a pet weighing about 150 pounds or more. In exemplary embodiments, the ramp/step device 100 shown in FIG. 1A can be devoid of cross members, i.e., members connecting one side of the frame 102 to the other side of the frame 102. In other embodiments, the exemplary ramp/step device 100 includes cross members for creating a more resilient and/or rigid supporting structure of the ramp/step device 100 components attached thereto.

The handle connection section 114 may further include a handle locking mechanism 120, e.g., a spring-loaded lock button/detent, a pin, and the like, configured and dimensioned to releasably secure the handle connection section 114 relative to the frame connection section 116. The frame connection section 116 includes a plurality of apertures/holes 122 configured and dimensioned to receive the handle locking mechanism 120. For example, if a spring-loaded lock button/detent is implemented, the extension of the telescoping handle 110 can be selected such that the spring-loaded lock button/detent "snaps" into a corresponding aperture/hole 122 to prevent the handle connection section 114 from further translation within or with respect to the frame handle section 116. Although only one handle locking mechanism 120 is depicted, it should be understood that in other embodiments, the frame 102 can include two handle locking mechanisms 120 located on each side of the frame 102 to create a stronger releasable connection between the handle connection section 114 and the frame connection section 116. Further, although only seven apertures/holes 122 are depicted, in other embodiments, greater and/or fewer apertures/holes 122 can be implemented, e.g., three, four, five, six, eight, nine, ten, and the like.

The support section 112 of the telescoping handle 110 can be positioned against a supporting structure, e.g., an inner surface of an automobile trunk, an inner surface of an automobile door, a ledge, and the like. Thus, the ramp/step device 100 can be fully supported by the area that the pet is entering and/or leaving, i.e., the ramp/step device 100 can be fully supported by the telescoping handle 110 and a distal end 134 of the frame 102, and does not require additional supports. In some embodiments, the telescoping handle 110 further includes at least two hooks 118. The hooks 118 can be detachably secured to the telescoping handle 110 with, e.g., a knob, screw, and the like, and can be "hooked" around or otherwise detachably secured with respect to a structure, e.g., an inner portion and/or edge of an automobile trunk, to prevent or minimize undesired motion, e.g., sliding, of the ramp/step device 100 during use. Protective guards 132, e.g., rubber protrusions, stoppers, and the like, may be located along the frame 102 to, e.g., prevent wear, provide traction, act as a shock absorber, prevent damage to surfaces upon which the ramp/step device 100 is positioned, and the like. The protective guards 132 may be fabricated from, e.g., rubber or any other suitable material used in the industry for such purposes. As an example, protective guards 132 placed on the support section 112 of the telescoping handle 110, as shown in FIG. 1A, prevent wear and/or damage to the support section 112, as well as prevent damage to the surface upon which the support section 112 is positioned onto during implementation of the ramp/step device 100. As a further example, the distal end 134 of the frame 102 includes protective guards 132 as a safety feature to prevent slippage of the ramp/step device 100 on the surface upon which the ramp/step device 100 is positioned.

Still with reference to the platform members 104 of FIG. 1A, the runners 106 can be manufactured from, e.g., stainless steel, aluminum, plastic, and/or any other suitable material, and can be movably secured to the frame by runner hinges 128. The runner hinges 128 include C-shaped connector elements configured and dimensioned for "snapping" around the frame 102 surface. As would be understood by those of ordinary skill in the art, in some embodiments, a modularity of positioning the runner hinges 128 along the entire length of the frame 102 can permit a user to adjust the distance between each step depending on the size of the pet using the ramp/step device 100. In some embodiments, the runner hinges 128 can be fixedly secured to the frame 102 at a predetermined distance relative to each other.

The riser 108 is movably mounted with respect to the runner by a riser hinge 124. The riser 108 is fabricated from, e.g., stainless steel, aluminum, and/or any other suitable material, and can be formed such that each end of the riser 108 is configured and dimensioned to be received by a complementary opening located in the runner 106. The riser 108 thereby rotates relative to the runner 106 at the riser hinge 124 to position the platform member 104 in a ramp mode or a step mode. Although illustrated as having a rod-like configuration which reduces the overall weight of the ramp/step device 100, in other embodiments, the riser 108 may be fabricated as a solid plate supporting the runner 106. Further, although illustrated with four platform members 104 in a step mode, it should be understood that some platform members 104 can be positioned in a ramp mode, while other platform members 104 can simultaneously be positioned in a step mode. For example, the first and last platform members 104 of the ramp/step device 100 can be positioned in a ramp mode, while the middle platform members 104 can be positioned in a step mode. For positioning the runner 106 into a ramp mode, the riser 108 is rotated such that it fits within the underside of the runner 106. In some exemplary embodiments, the runner 106 can include a runner/riser locking mechanism (not shown), e.g., a magnet, a lip into which the riser 108 can "snap", and the like, located on the underside of the runner 106 for releasably securing the riser 108 when the runner 106 is being positioned into a ramp mode. In addition, the runner 106 can include a runner locking mechanism, e.g., a spring-loaded ball and/or protrusion on the runner 106 and a complementary opening in the frame 102 and/or riser supports 126 configured to receive the spring-loaded ball and/or protrusion (not shown), for releasably locking the runner 106 in the ramp mode and/or during folding of the ramp/step device 100.

With respect to positioning the platform members 104 into the step mode, the frame includes a pair of riser supports 126 for each platform member 104. Each pair of riser supports 126 is configured and dimensioned to receive and releasably secure a riser 108. For example, the pair of riser supports 126 can be configured and dimensioned as grooves attached to the frame 102 into which each corner of the riser 108 "snaps" during positioning of the platform member 104 in step mode. In particular, the riser 108 for a platform member 104 can be rotated at the riser hinge 124, positioned over a riser support 126, and releasably secured with respect to the riser support 126 by, e.g., providing a downwardly directed force on the platform member 104 to ensure that the riser 108 "snaps" into the riser support 126. Securing the riser 108 with respect to the riser supports 126 permits the riser 108 to fixedly support the runner 106 against the pair of riser supports 126 when positioned in a step mode. The positioning of the riser supports 126 along the frame 102 ensures that the runner 106 is generally parallel relative to the surface upon which the ramp/step device 100 is positioned. Similar to the runner hinge 128 configuration, in some embodiments, the riser supports 126 are movably secured to the frame with C-shaped connector elements configured and dimensioned to "snap" around the frame 102 surface. A modularity of positioning the riser supports 126 and the runner hinges 128 along the entire length of the frame 102 according to some embodiments of the present disclosure permits a user to adjust the distance between each step depending on the size of the pet using the ramp/step device 100. In some embodiments, the riser supports 128 are fixedly secured to the frame 102 at a predetermined distance relative to each other and/or the runner hinges 128.

In some embodiments, the runners 106 of each platform member 104 include a textured surface 130, e.g., carpeting, rubber, and the like, to create greater comfort and/or traction for the pet utilizing the ramp/step device 100. Thus, the textured surface 130 may provide a softer surface upon which the pet walks and creates traction to prevent, e.g., slippage, of the pet during utilization of the ramp/step device 100.

As would be understood by those of ordinary skill in the art, the riser 108 may be pulled out of or otherwise disengaged relative to the riser supports 126 and further rotated into the space on the lower surface of the runner 106 for conversion of the ramp/step device 100 into the ramp mode. In some embodiments, the pair of riser supports 126 protrudes from the frame 102 such that when in ramp mode, the pair of riser supports 126 further support the runner 106 when the runner 106 is rotated into the ramp mode position along the runner hinge 128. In particular, a bottom surface of the runner 106 is supported by the riser supports 126 such that the runner 106 does not rotate further along the runner hinge 128 than desired to achieve the ramp mode position.

The frame 102 includes a frame hinge 136 for folding the frame 102 of the ramp/step device 100 into a folded position for, e.g., transport, storage, and the like. The platform members 104 may initially be positioned in the ramp mode prior to folding the frame 102 to create a compact volumetric area for the ramp/step device 100 in the folded position. A frame locking mechanism 138, e.g., a folding rubber strap, clasp, and the like, located on the frame 102 may be utilized for locking and/or closing the frame 102 in the folded position. Although FIG. 1A depicts the frame locking mechanism 138 positioned at a proximal end 140 of the frame 102, it should be understood that the frame locking mechanism 138 may be positioned at alternative positions along the length of the frame 102, e.g., near the distal end 134 of the frame 102. It should further be understood that the frame 102 and the frame locking mechanism 138 include complementary components, e.g., magnets, pins, protrusions, holes, hooks, and the like, configured and dimensioned to mate or otherwise cooperate, thereby locking the frame 102 in the folded position. Once in the folded position, the telescoping handle 110 can be used as a handle for carrying the ramp/step device 100.

Figure 1B:
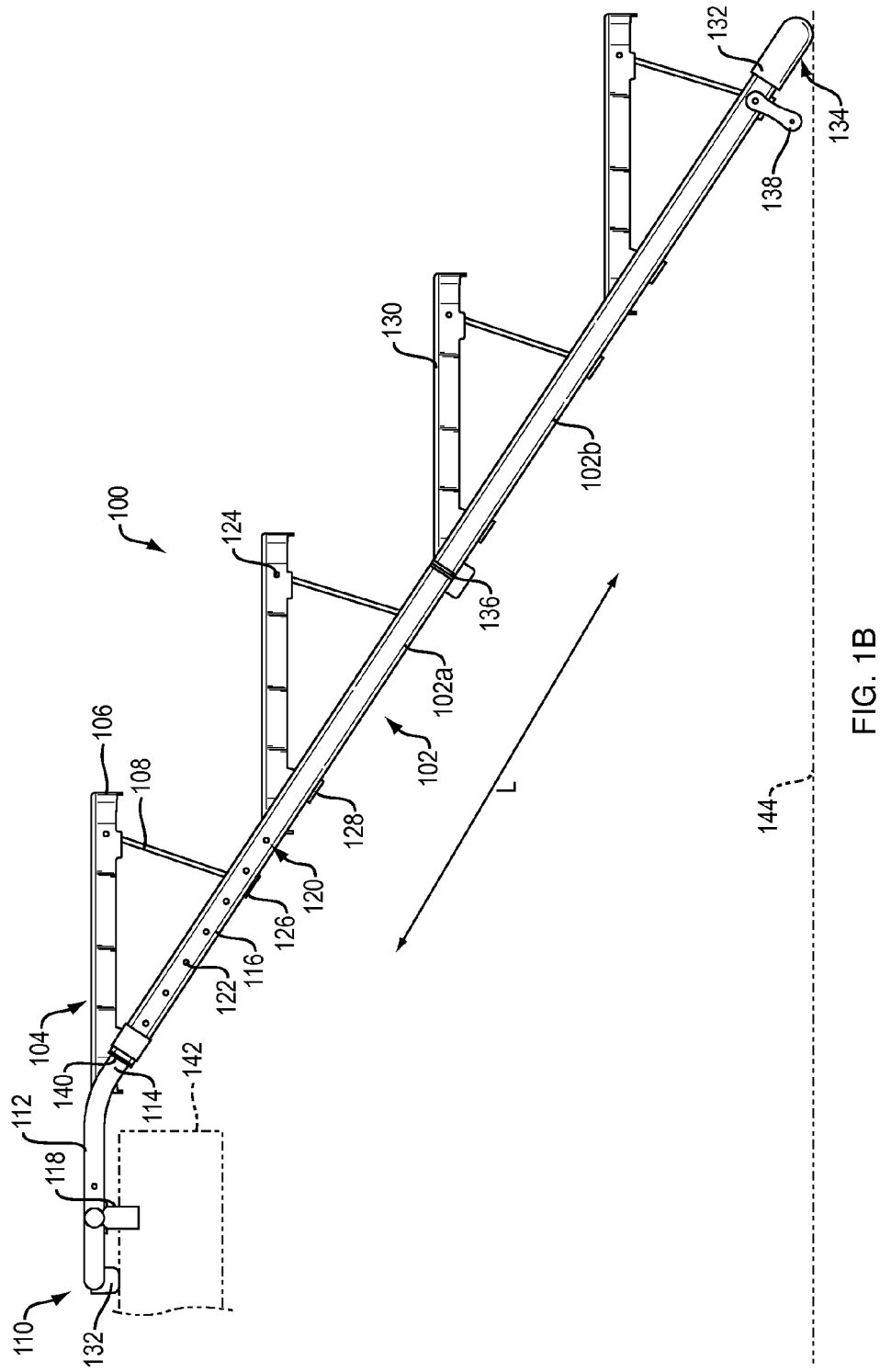

Turning now to FIG. 1B, a side view of exemplary ramp/step device 100 is provided in a non-extended, unfolded and step mode configuration. As can be seen, the runners 106 are supported by the risers 108, which in turn are supported by the riser supports 126, such that the runners 106 are generally parallel to a surface upon which the ramp/step device 100 is positioned. As discussed above, the ramp/step device 100 is fully supported by a lower surface 144, e.g., the ground, upon which the distal end 134 of the frame 102 is positioned and an upper surface 142, e.g., the area which the pet wishes to enter/exit (for example, a car trunk area). The configuration of the risers 108 thereby ensures that the runners 106 are positioned substantially parallel to at least one of the upper surface 142 and/or the lower surface 144. Although illustrated as positioned at an angle relative to the runner 106, in other embodiments, the riser 108 may generally be perpendicular to the runner 106 when the ramp/step device 100 is positioned in the step mode.

Figure 1C:
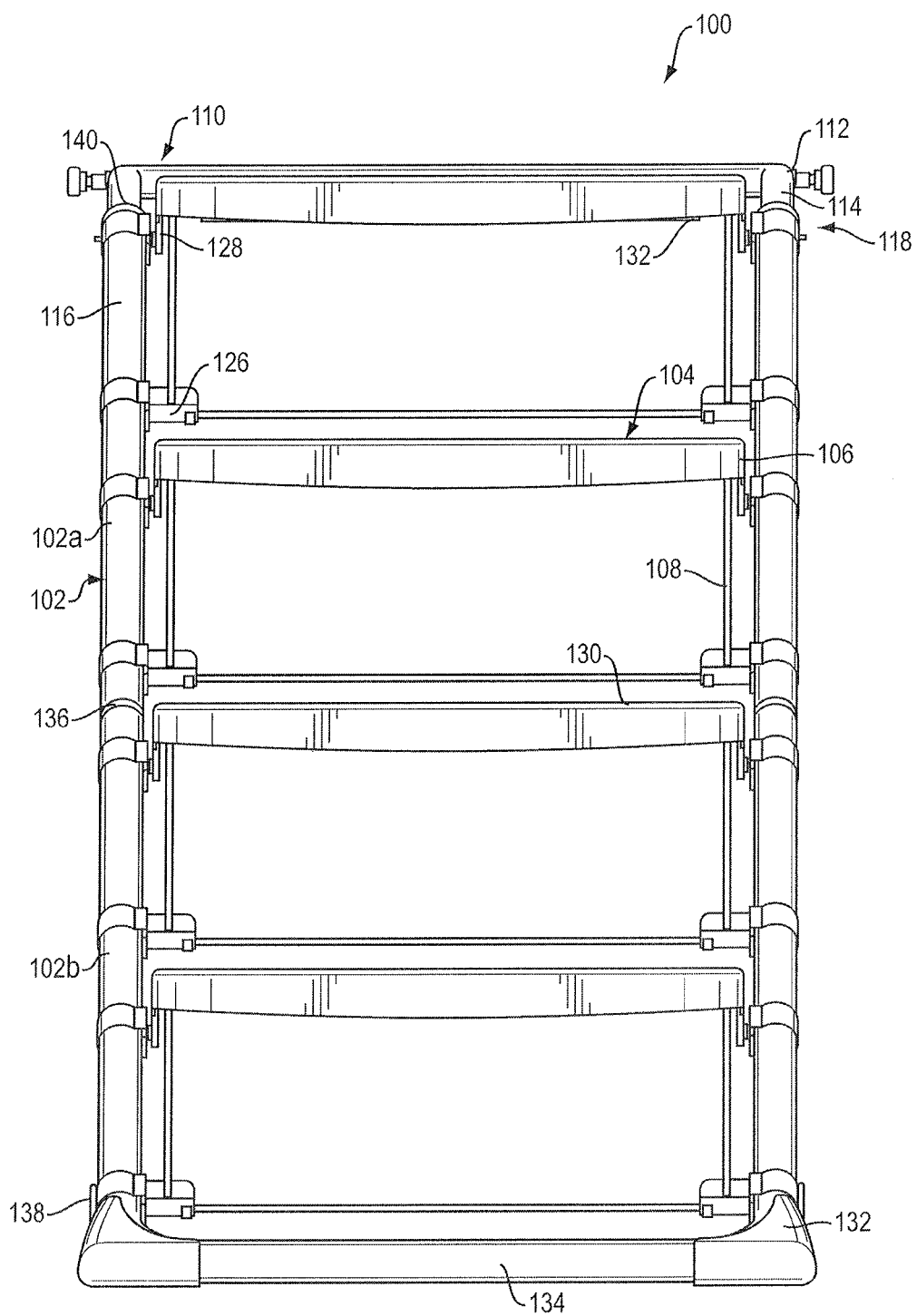

FIG. 1C is a front view of the exemplary ramp/step device 100 in a non-extended, unfolded and step mode configuration. In particular, it can be seen that a pair of riser supports 126 connect to and extend from the frame 102 to support each riser 108. It can further be seen that the runners 106 can be dimensioned to be wider than the risers 108. Thus, as explained previously, for positioning the platform members 104 into the ramp mode configuration, the risers 108 can be rotated into and received by the underside of the respective runners 106 and/or a runner/riser locking mechanism. Further, the riser supports 126 protrude out of the frame to support the runners 108 during the ramp mode configuration by preventing rotation of the runners 108 past a predetermined point, thereby aligning the runners 108 in a substantially planar and/or even manner.

Figure 2A:
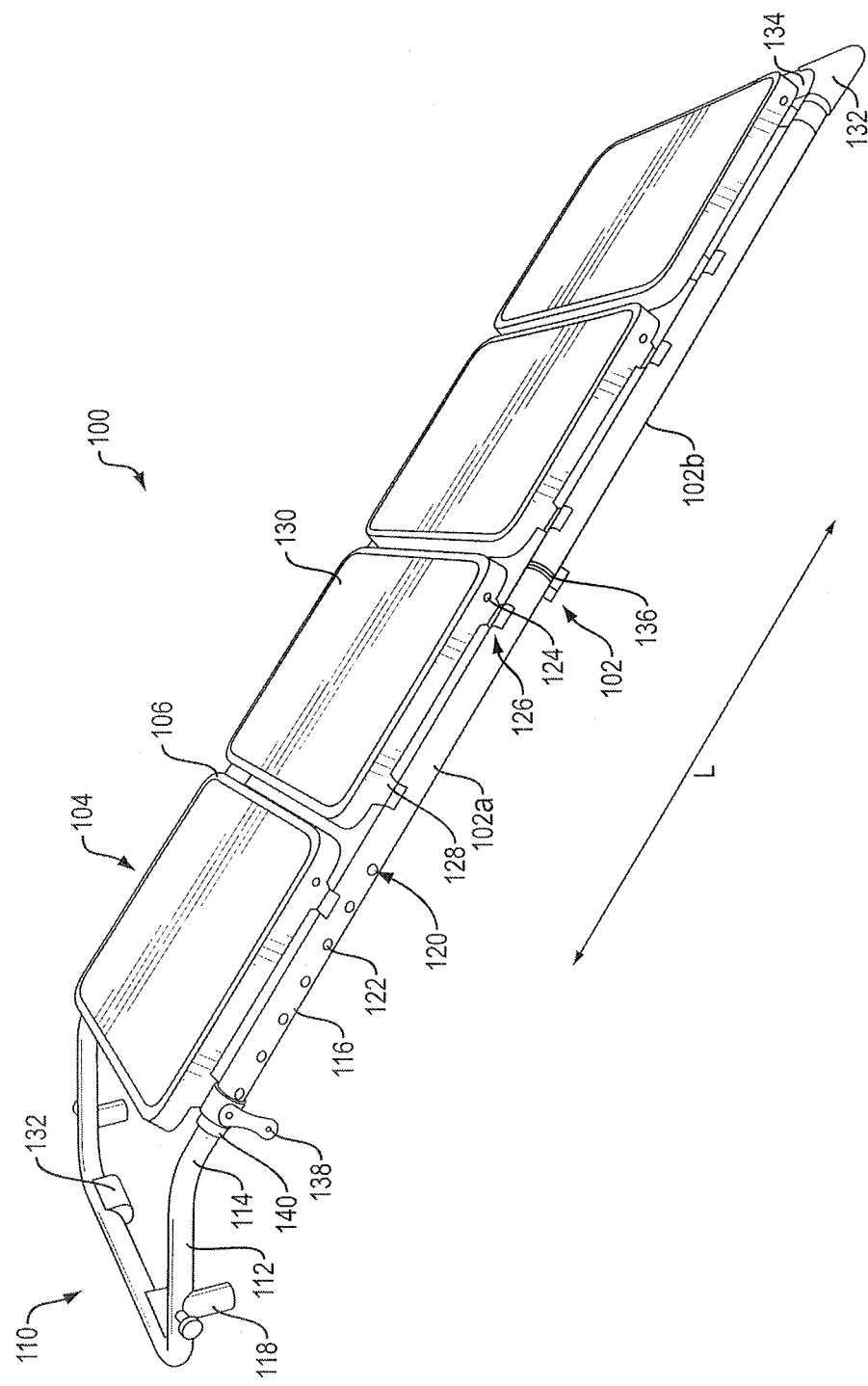
FIGS. 2A-E are perspective, side, front and bottom views of an exemplary four-platform ramp/step device in a non-extended, unfolded and ramp mode configuration.

With reference to FIG. 2A, a perspective view of the exemplary ramp/step device 100 is provided in a non-extended, unfolded and ramp mode configuration. As discussed previously, to position the ramp/step device 100 in the ramp mode configuration, the risers 108 are unsecured or otherwise released from the riser supports 126 and are further secured/engaged within the underside of the respective runners 106 by, e.g., a runner/riser locking mechanism (not shown). The runners 106 are rotated along the runner hinges 128 and positioned against the riser supports 126. In some embodiments, the runner 106 and the frame 102, e.g., the frame sections 102a and/or 102b, and/or the riser supports 126 may include a runner locking mechanism (not shown), e.g., complementary features configured and dimensioned to detachably lock the runner 106 in the ramp mode position. It should be understood that the platform members 104 and the riser supports 126 are configured and dimensioned such that when the runners 106 are positioned in the ramp mode configuration, the runners 106 create a substantially planar and/or even surface upon which the pet can travel. Further, the runners 106 are configured and dimensioned to reduce the spacing and/or gaps between the runners 106 when positioned in the ramp mode configuration, thus reducing the risk of a pet's paw inadvertently entering the spaces between the runners 106. As discussed above, although illustrated with each of the four platform members 104 in the ramp mode configuration, as desired by the user, some of the platform members 104 can be positioned in the ramp mode configuration, while other platform members 104 are positioned in the step mode configuration.

Figure 2B:
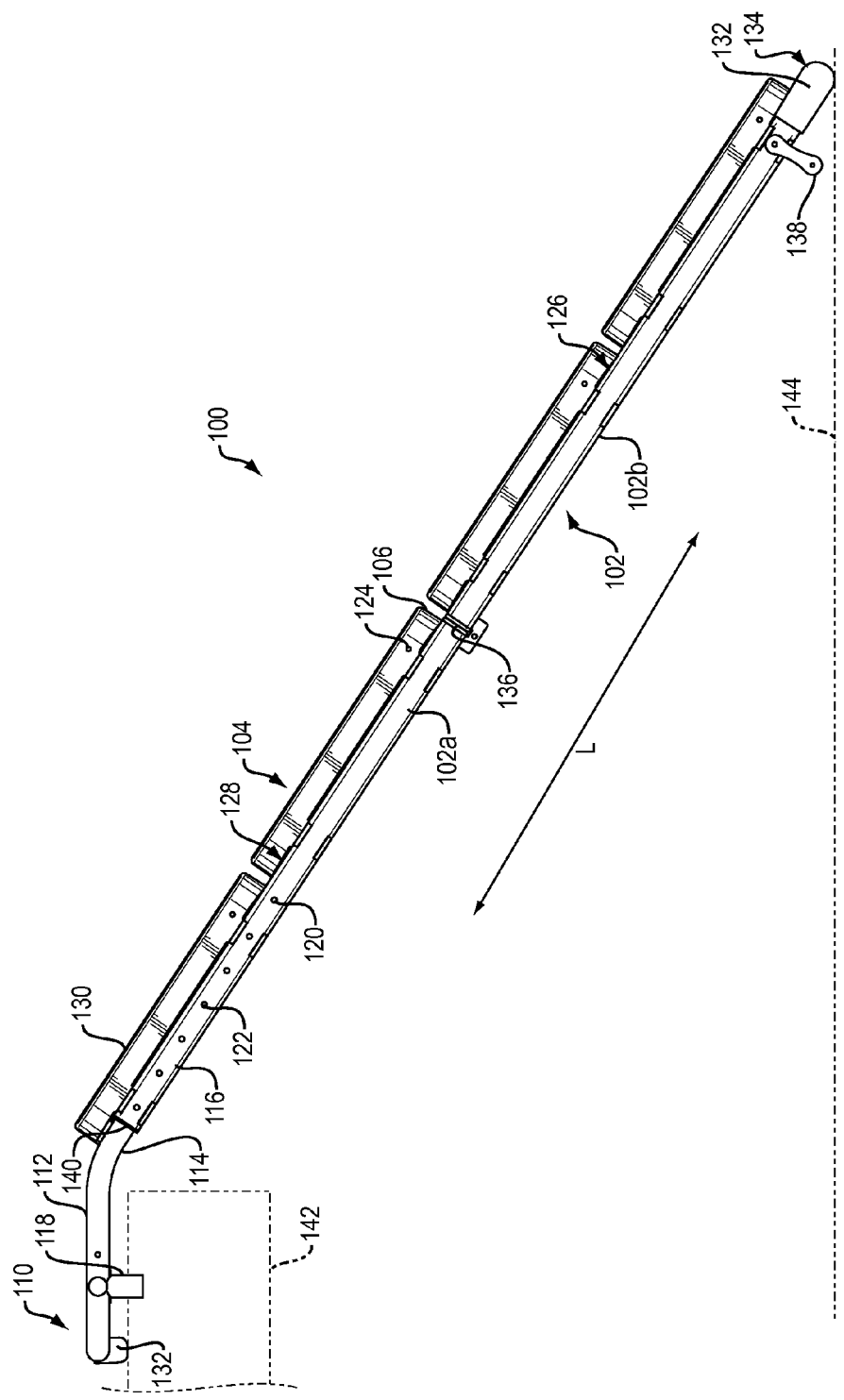

FIG. 2B is a side view of exemplary ramp/step device 100 in a non-extended, unfolded and ramp mode configuration. As can be seen, the positioning of the platform members 104 creates a substantially even and/or planar ramp surface. The textured surface 130 of each runner 106, e.g., creates traction for the pet as it ascends and/or descends the ramp, thus preventing slippage of the pet's paws. Similar to the depiction in FIG. 1B, the ramp/step device 100 is fully supported by the lower surface 144 upon which the distal end 134 of the frame 102 is positioned and the upper surface 142 upon which the support section 112 of the telescoping handle 110 is positioned.

Figure 2C:
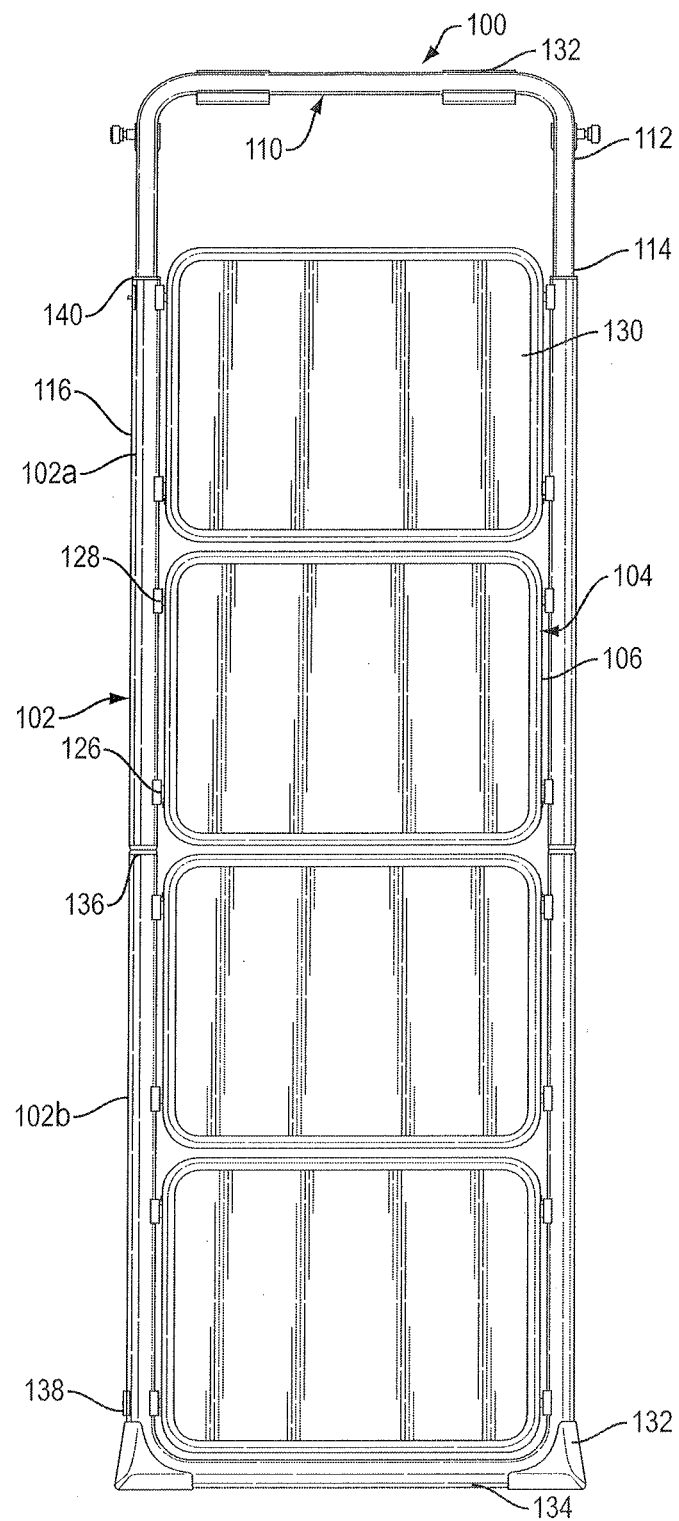
Figure 2D:
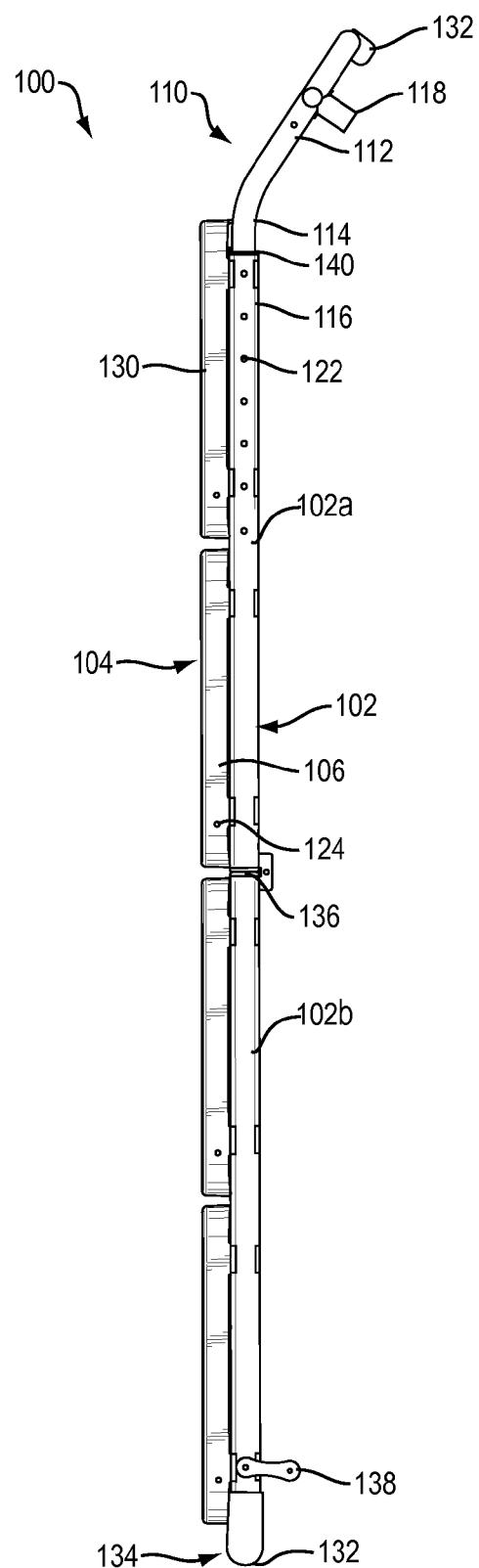
Figure 2E:
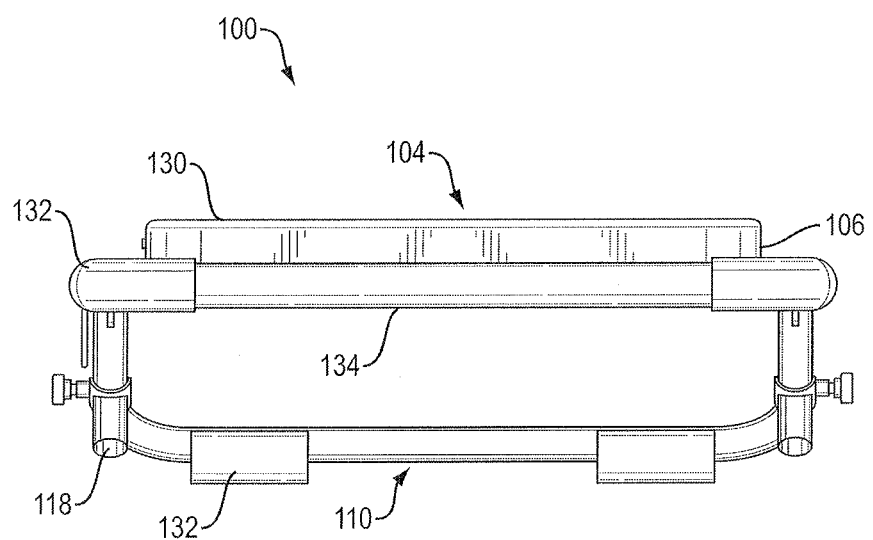

Turning to FIGS. 2C-E, the front, side and bottom views of the exemplary ramp/step device 100 are provided in a non-extended, unfolded and ramp mode configuration. As can be seen, the profile of the ramp/step device 100 is substantially narrow, thus reducing the weight of the ramp/step device 100 and the amount of space required to store and/or set up the ramp/step device 100.

Figure 3:
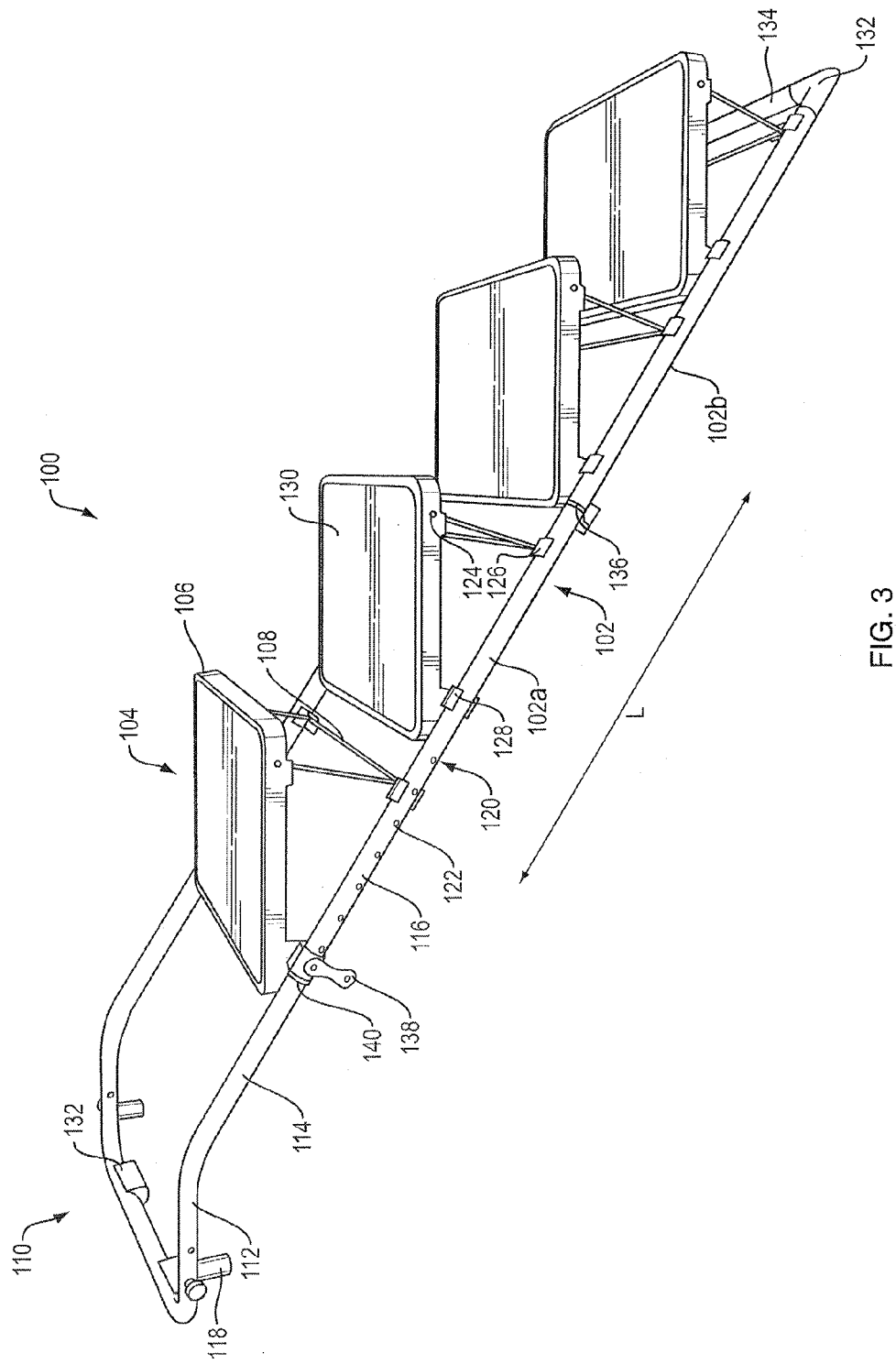
FIG. 3 is a perspective view of an exemplary four-platform ramp/step device in an extended, unfolded and step mode configuration.
Figure 4:
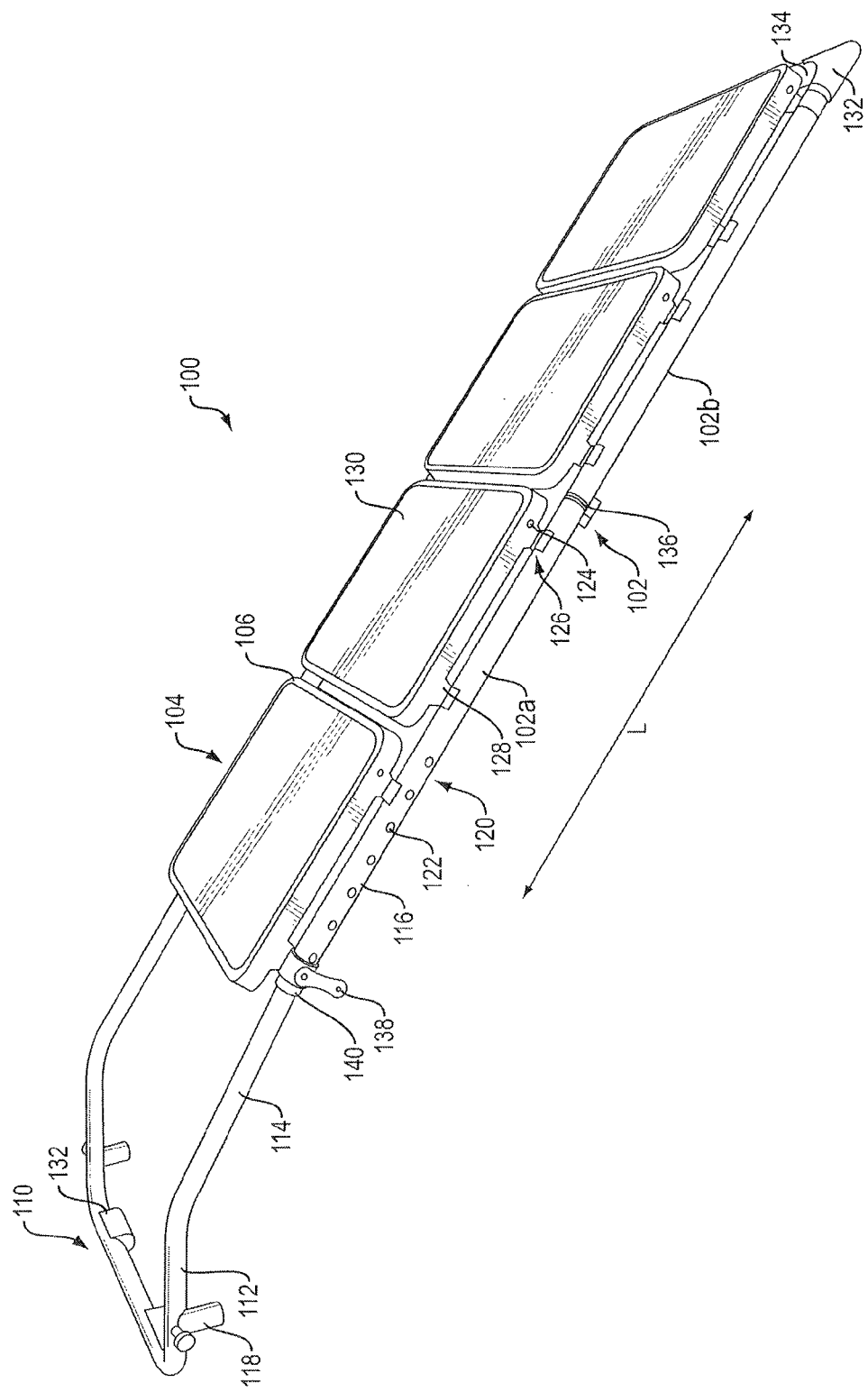
FIG. 4 is a perspective view of an exemplary four-platform ramp/step device in an extended, unfolded and ramp mode configuration.

With reference to FIGS. 3 and 4, exemplary ramp/step device 100 is illustrated in extended, unfolded and step and ramp mode configurations, respectively. In particular, the handle locking mechanism 120 can be actuated, e.g., the spring-loaded lock button/detent can be depressed, to permit the handle connection section 114 of the telescoping handle 110 to translate within or with respect to the frame connection section 116. Once the telescoping handle 110 is extended from the frame 102, e.g., the frame section 102a, to a desired distance based upon the height of the upper surface 142 shown in FIGS. 1B and 2B, the handle locking mechanism 120 mates with an appropriate aperture/hole 122 on the frame connection section 116, e.g., the spring-loaded lock button/detent "snaps" into the appropriate aperture/hole 122, to releasably secure the telescoping handle 110 in the desired location. The height and/or distance of the exemplary ramp/step device 100 is thereby adjusted based on the desired implementation by the user. Thus, for example, the user can extend the telescoping handle 110 based on the height of the supporting structure, i.e., the upper surface 142, position the ramp/step device 100 against the upper surface 142 and the lower surface 144, and further position the platform members 104 into one of a ramp mode and/or a step mode.

Figure 5A:
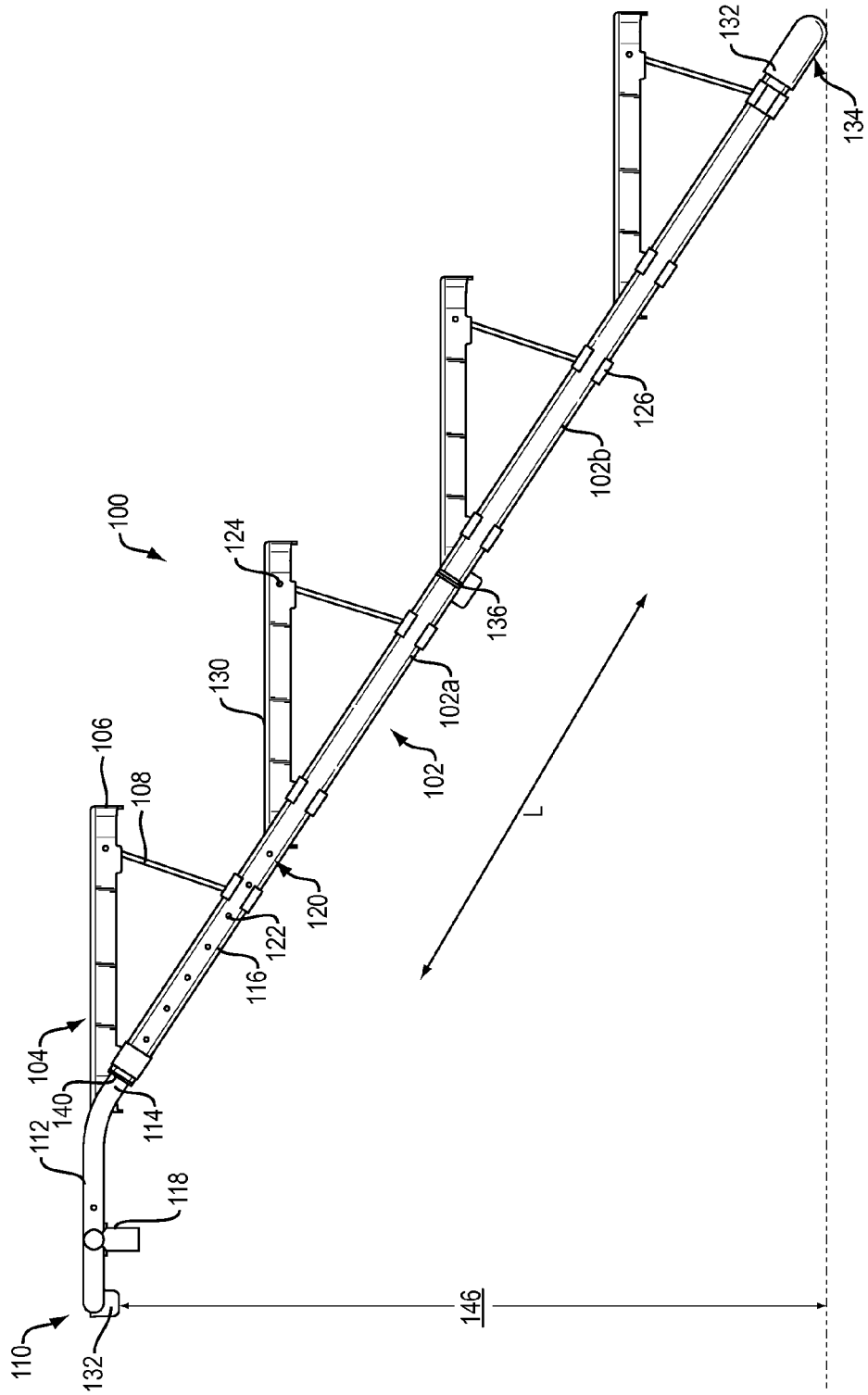
FIGS. 5A and B are side views of exemplary four-platform ramp/step devices in a non-extended and extended step mode configuration.
Figure 5B:
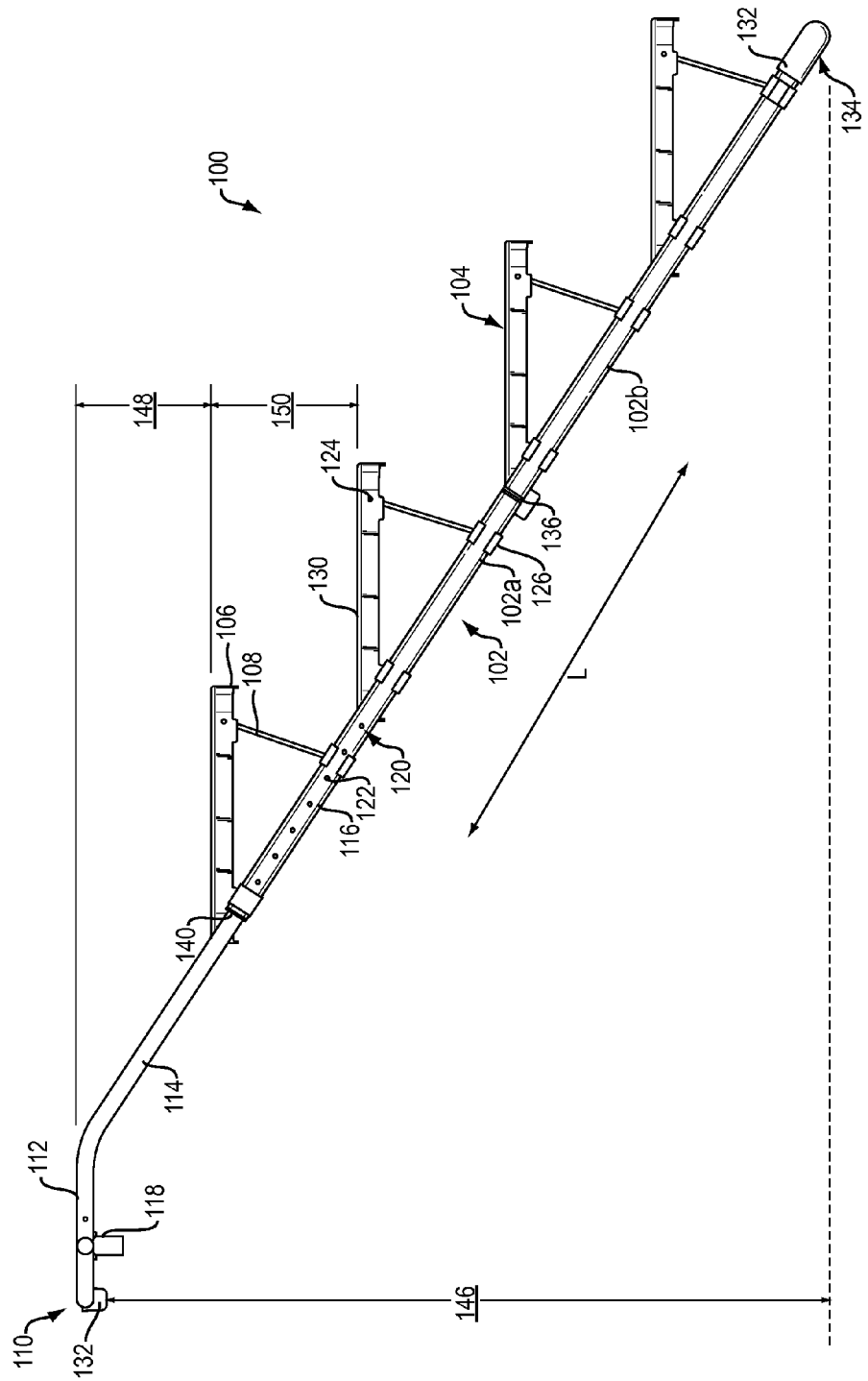

FIGS. 5A and 5B are side views of the exemplary ramp/step device 100 in a non-extended and an extended configuration, respectively. In particular, FIGS. 5A and 5B illustrate the differences in height between the non-extended and extended configurations of the ramp/step device 100. For example, in one embodiment, the height 146 of the non-extended ramp/step device 100 can be about 27.74 inches, while the height 146 of the extended ramp/step device 100 can be about 32.7 inches. It should be understood that in other embodiments, the height 146 of the ramp/step device 100 can be a variety of dimensions based on, e.g., the number of platform members 104 being implemented, the distance between platform members 104 due to the size of the pet, and the like. While intermediate extensions of the handle connection section 114 are possible, i.e., extensions between the non-extended position and the fully extended position, a full extension of the handle connection section 114 extends the height 146 of the non-extended ramp/step device 100 by an extension height 148. In some embodiments, the extension height 148 can be substantially equal to the platform-to-platform height 150 or approximately a height of one of the risers 108. Thus, in some embodiments, a fully extended telescoping handle 110 is substantially equivalent to an addition of a platform member 104 to the ramp/step device 100, i.e., the surface upon which the support section 112 is positioned acts as an additional platform member 104. The wide selection of extension heights offers the user flexibility, efficiency and simplicity in implementing the ramp/step device 100 in a variety of locations and/or environments.

Figure 6A:
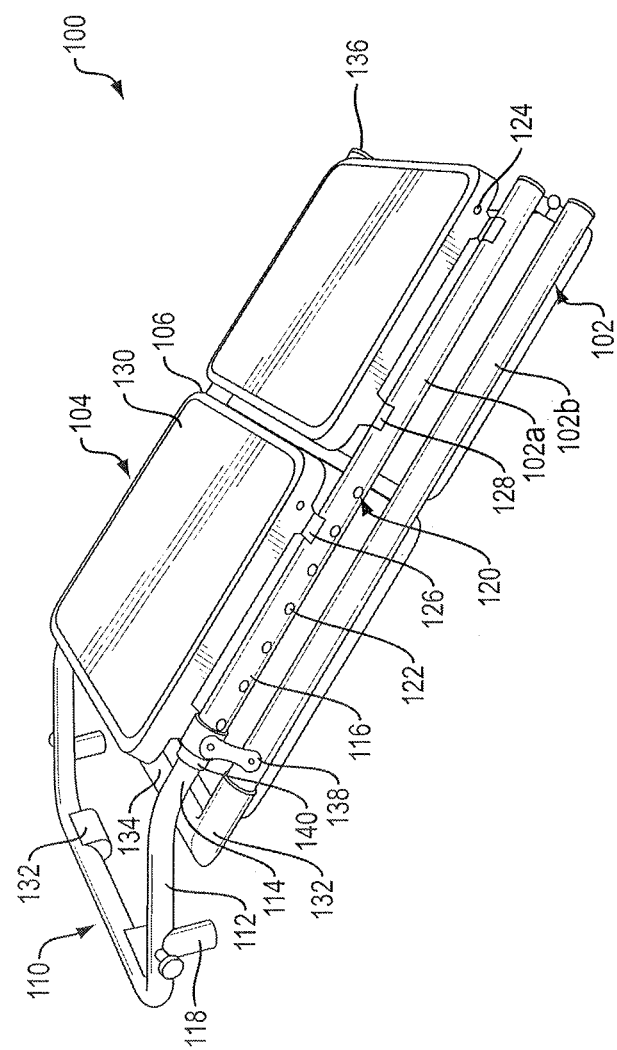
FIGS. 6A-C are perspective, front and side views of an exemplary four-platform ramp/step device in a folded configuration.

Turning now to FIG. 6A, a perspective view of the exemplary ramp/step device 100 is provided in a folded configuration in which frame sections 102a and 102b are rotated towards each other. In particular, the platform members 104 are positioned and/or secured in the ramp configuration and the frame sections 102a and 102b, are folded so that the frame is folded in half about the frame hinge 136. The frame sections 102a and 102b, which face each other in the folded configuration, may include protective guards 132 to, e.g., prevent wear, act as a shock absorber, and the like, during folding, unfolding and/or implementation of the ramp/step device 100. The frame locking mechanism 138, e.g., a folding rubber strap, clasp, and the like, is utilized for detachably securing the frame 102 in the folded position. Thus, in the folded position, the distal end 134 and the proximal end 140 of the frame 102 are positioned substantially near each other. As should be noted with respect to FIG. 6A, the telescoping handle 110 protrudes out of and above the compact frame 102 configuration of the ramp/step device 100 in the folded position. Thus, the exemplary ramp/step device 100 can be folded into a compact, portable package with a conveniently located telescoping handle 110 which can be utilized to carry the ramp/step device 100.

Figure 6B:
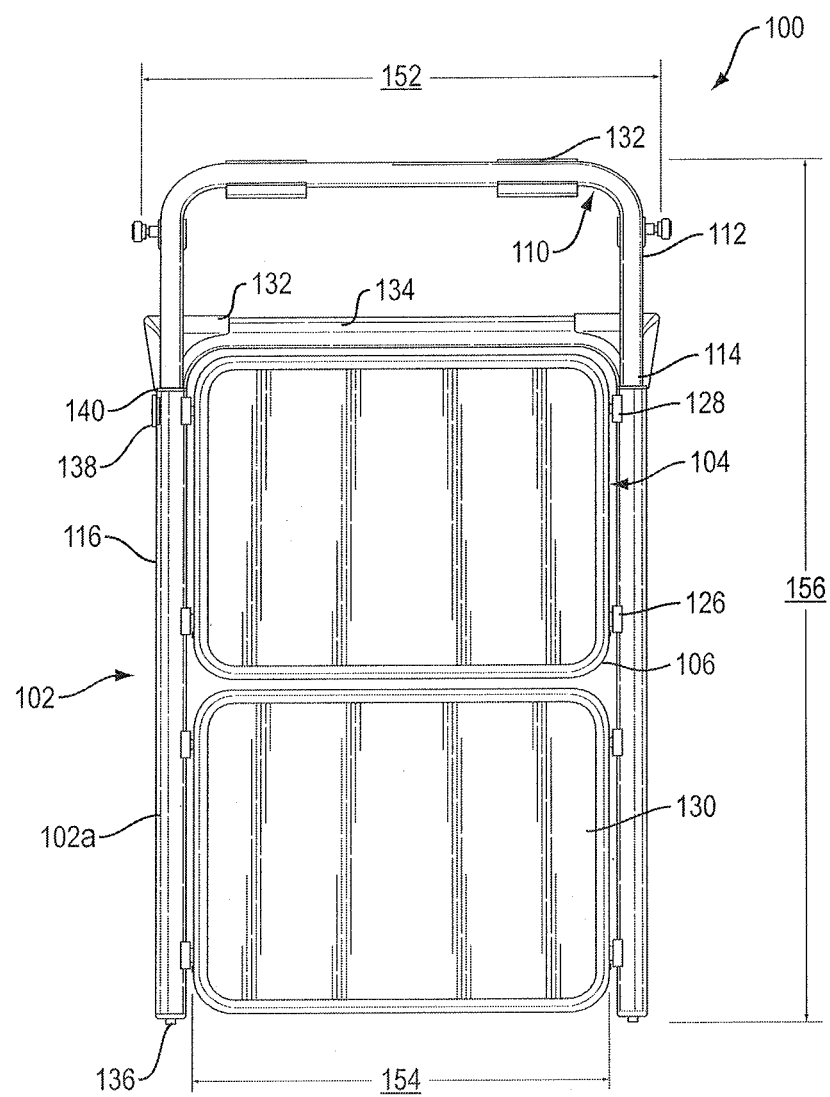
Figure 6C:
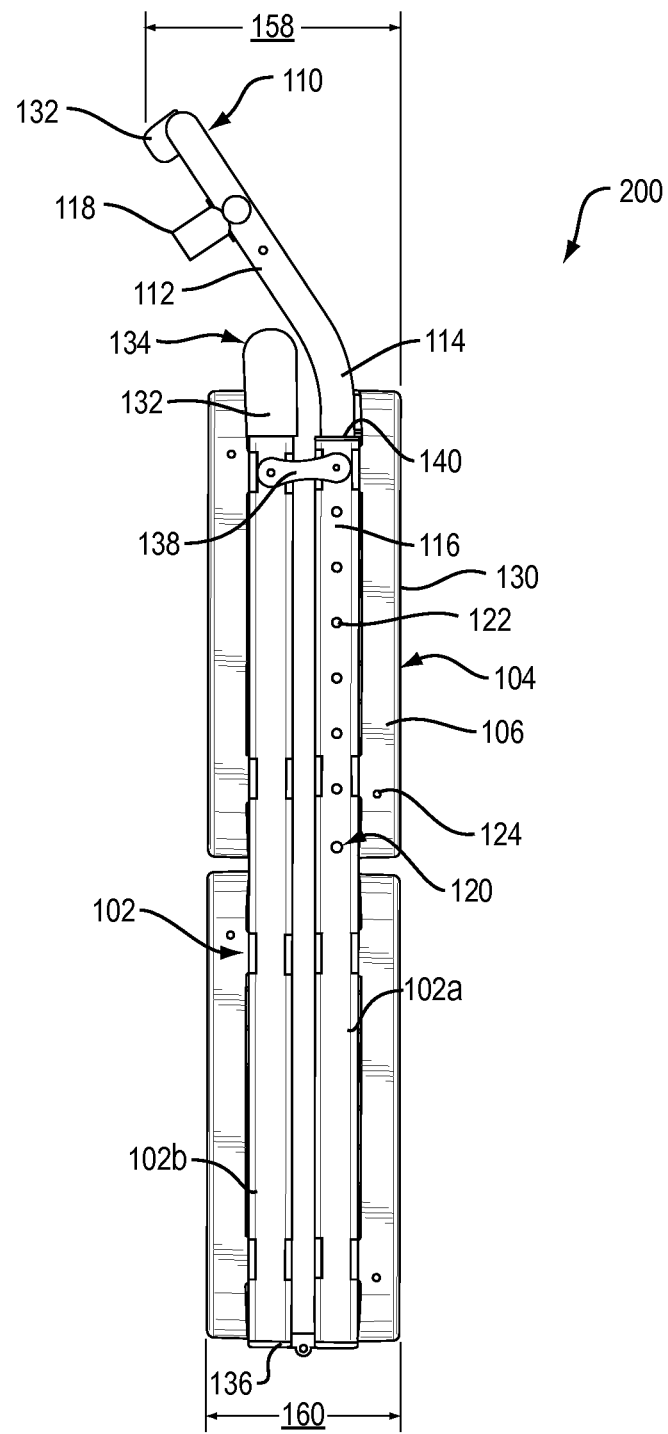

With respect to FIGS. 6B and 6C, the front and side views of exemplary ramp/step device 100 in a folded configuration are illustrated. As can be seen, the two portions of the folded frame 102 are detachably secured to each other with the frame locking mechanism 138. Further, the telescoping handle 110 extends above the folded frame 102 and can be used to carry the folded ramp/step device 100. In some embodiments, with specific reference to FIG. 6B, the overall width 152 of the ramp/step device 100 can be about 19.12 inches, the platform member width 154 can be about 15.38 inches, and the overall folded height 156 can be about 32.17 inches. With specific reference to FIG. 6C, the overall depth 158 of the ramp/step device 100 can be about 6.61 inches and the folded platform member depth 160 can be about 5.01 inches. However, it should be understood that the dimensions discussed herein are merely for illustrative purposes and should not be construed as limitations of the exemplary ramp/step device 100. In particular, the overall width 152, the platform member width 154, the overall folded height 156, the overall depth 158 and the folded platform member depth 160 of the exemplary ramp/step device 100 may be a variety of dimensions based on, e.g., the number of platform members 104 being implemented, the size of the pet utilizing the ramp/step device 100, and the like.

Figure 7A:
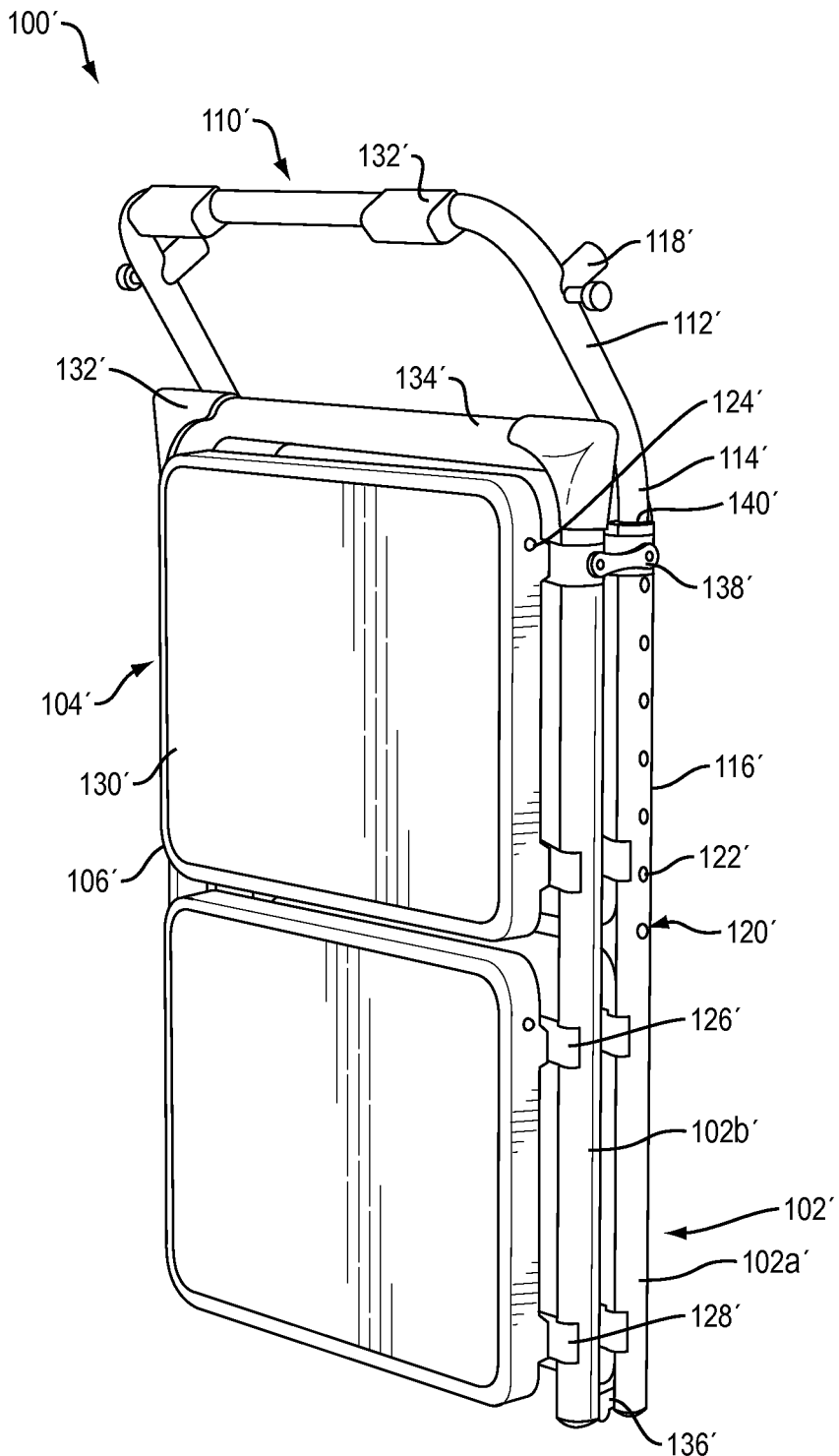
FIGS. 7A-C are back perspective, front perspective and side views of an alternative exemplary four-platform ramp/step device in a folded configuration.
Figure 7B:
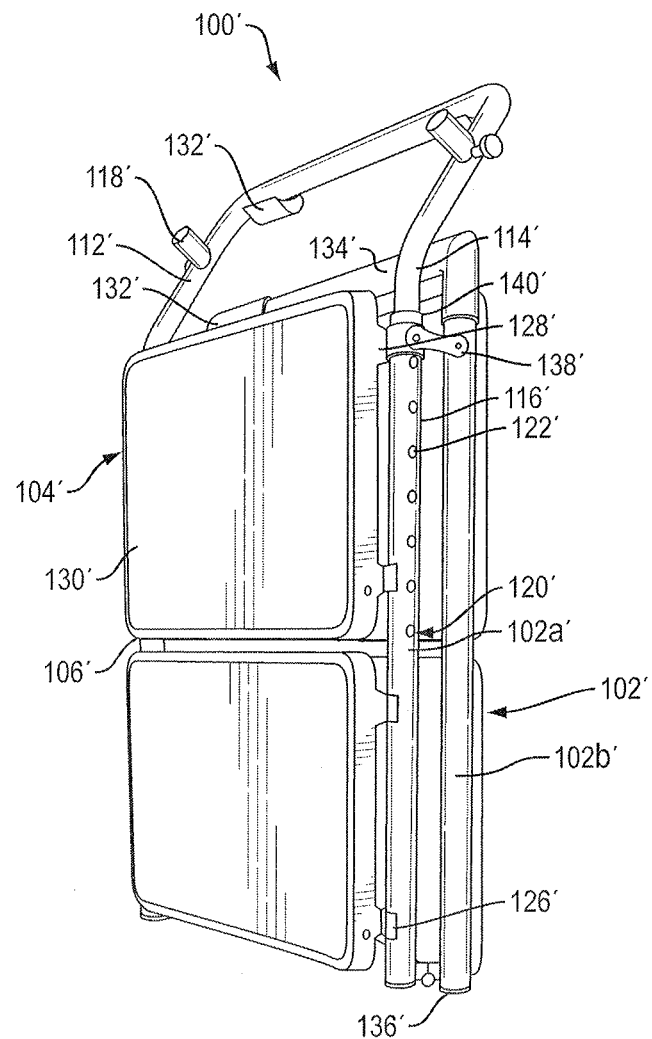
Figure 7C:
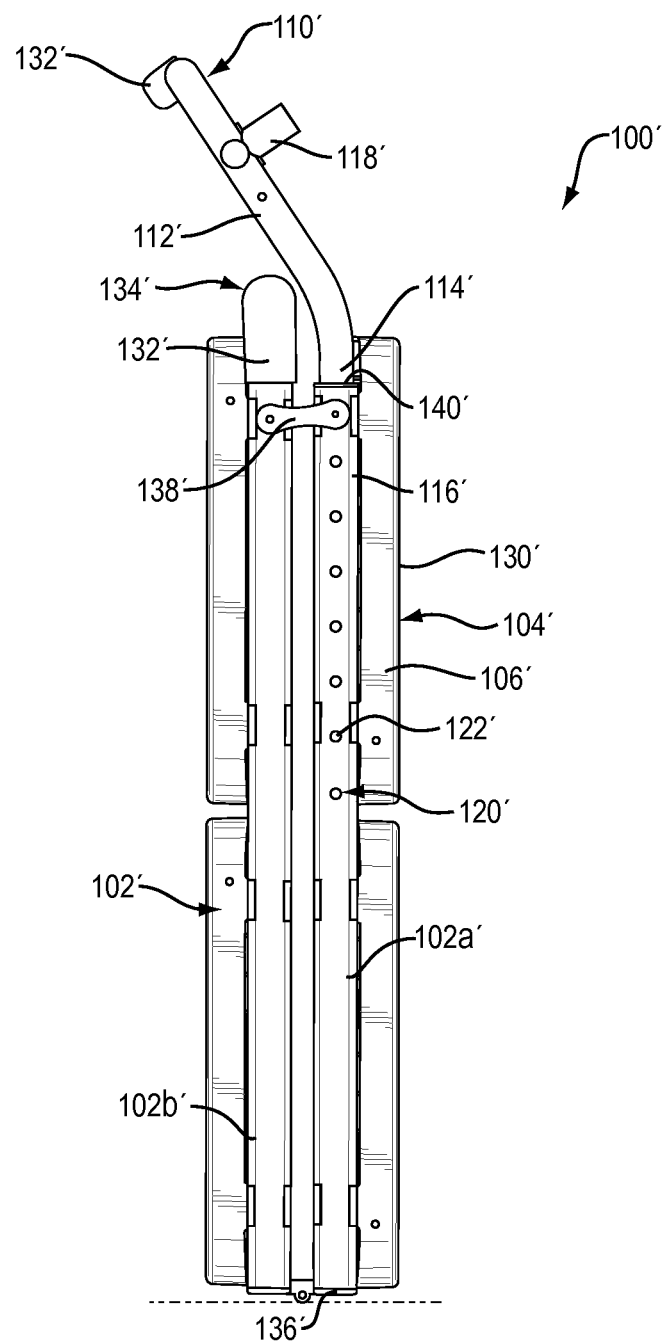

FIGS. 7A-C are back perspective, front perspective and side views of an alternative exemplary embodiment of the ramp/step device 100'. In should be understood that the reference numbers including the prime symbol designate the same structural and functional component as described above, unless noted otherwise. In particular and as discussed previously, the two hooks 118' are configured to be detachably secured to the support section 112' of the telescoping handle 110'. In contrast to the exemplary ramp/step devices 100 previously illustrated which included two hooks oriented posteriorly relative to the support section 112, the exemplary ramp/step device 100' of FIGS. 7A-C includes two hooks 118' oriented anteriorly relative to the support section 112'. Thus, it should be understood that the two hooks 118' can be oriented anteriorly and/or posteriorly relative to the support section 112' based on the desires of the user or can be removed completely if not required by the user.

Figure 8:
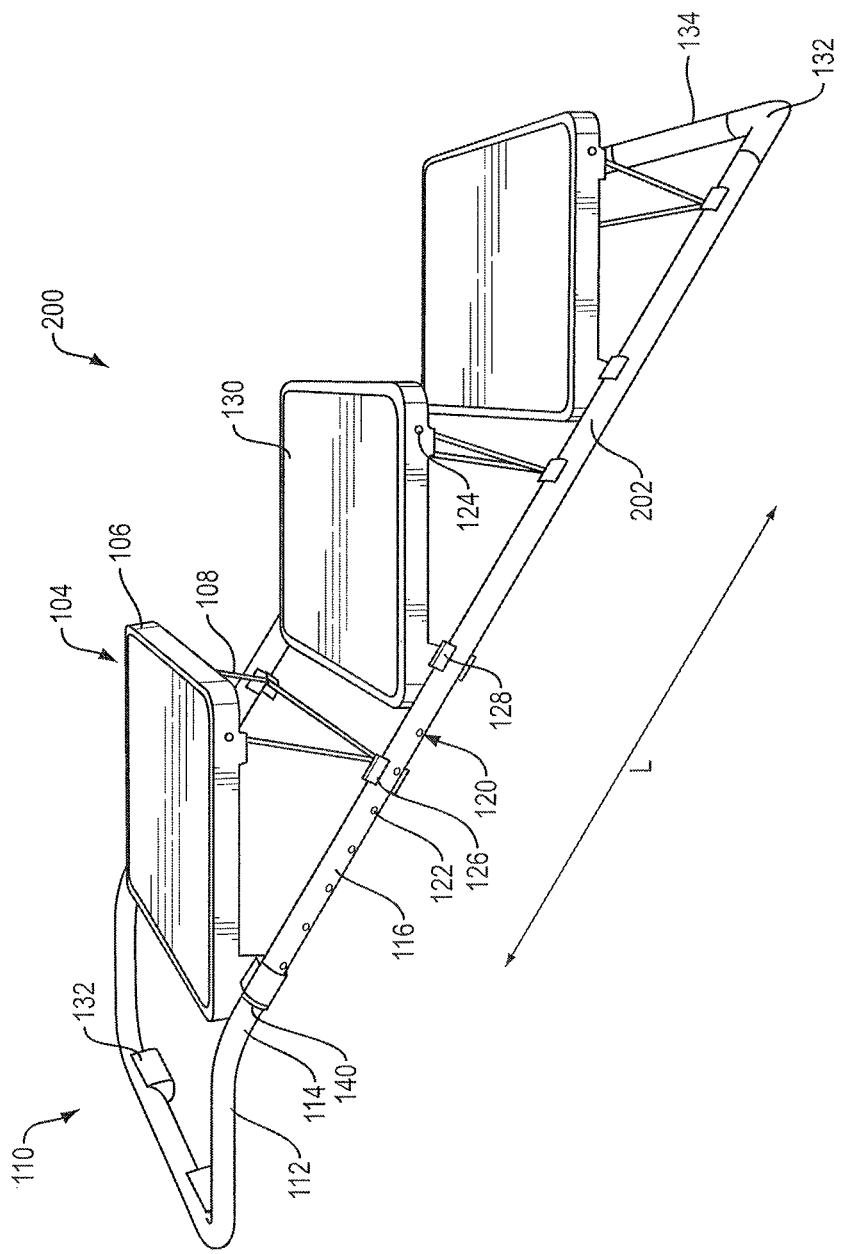
FIG. 8 is a perspective view of an exemplary three-platform ramp/step device in a non-extended and step mode configuration.
Figure 9:
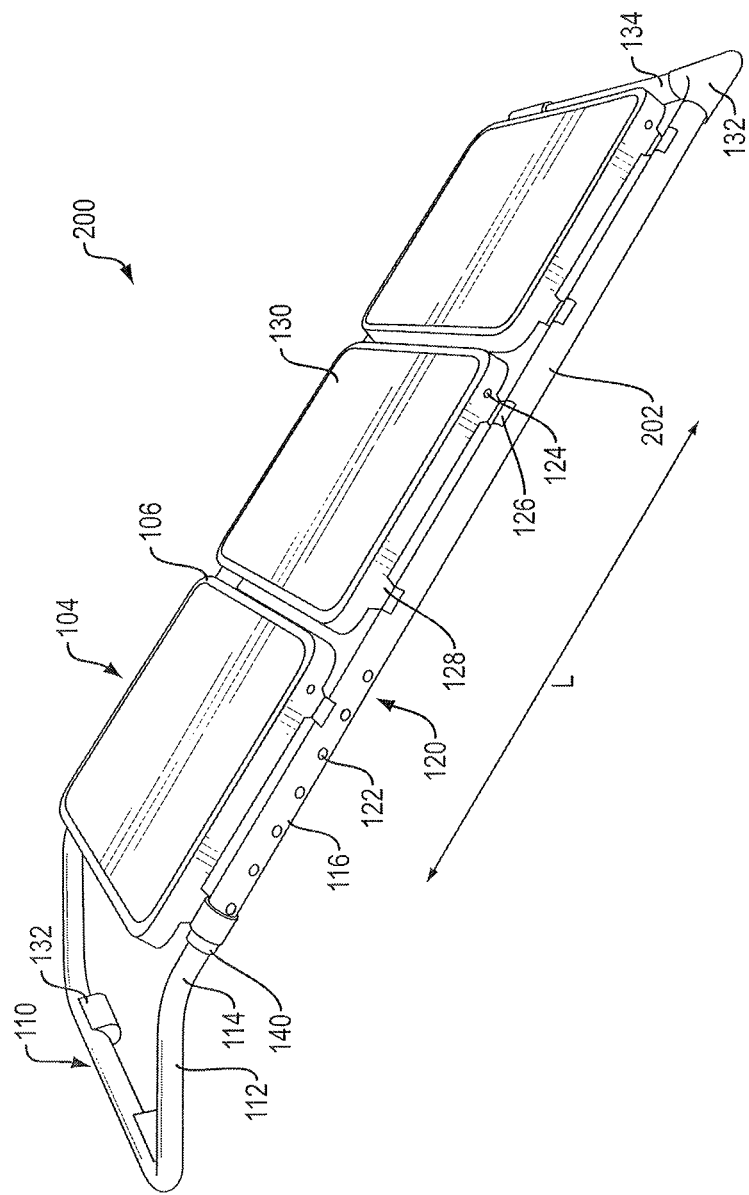
FIG. 9 is a perspective view of an exemplary three-platform ramp/step device in a non-extended and step mode configuration.

Turning to FIG. 8, a perspective view of an exemplary three platform member 104 ramp/step device 200 is illustrated in a non-extended and step mode configuration. Other than including three platform members 104 and the frame 202 being dimensioned for a three platform member 104 configuration, the ramp/step device 200 of FIG. 8 is configured and functions substantially similarly to the ramp/step devices 100 previously discussed. In the present embodiment, the ramp/step device 200 of FIG. 8 does not include a frame hinge 136 and a frame locking mechanism 138. In some embodiments, the ramp/step device 200 can include a frame hinge 136 and a frame locking mechanism 138 substantially similar to those discussed previously to permit the ramp/step device 100 to fold for, e.g., storage, transport, and the like. Similarly, FIG.

9 depicts a perspective view of an exemplary three platform member 104 ramp/step device 200 in a non-extended and ramp mode configuration.

Figure 10A:
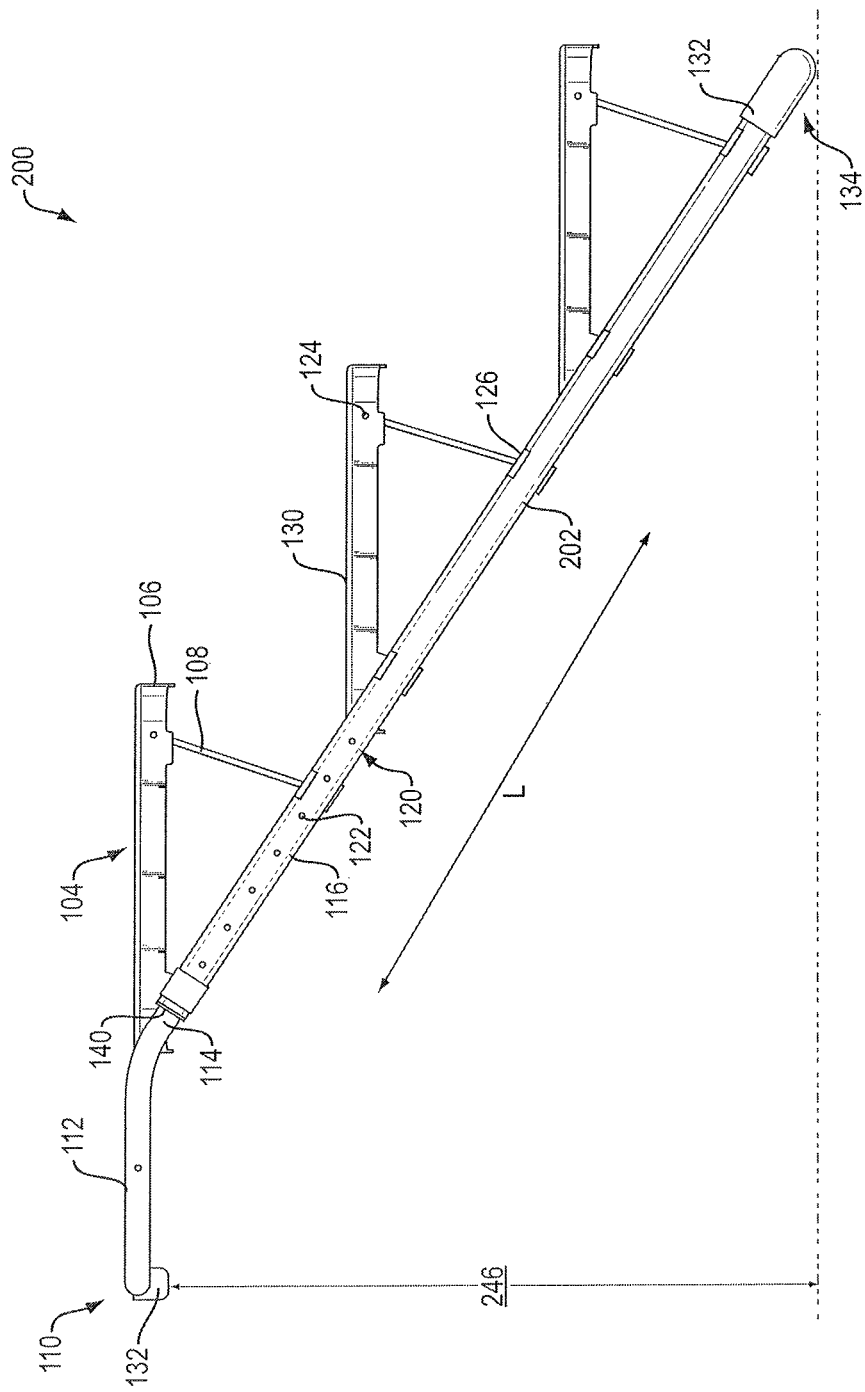
FIGS. 10A and B are side views of exemplary three-platform ramp/step devices in a non-extended and extended step mode configuration.
Figure 10B:
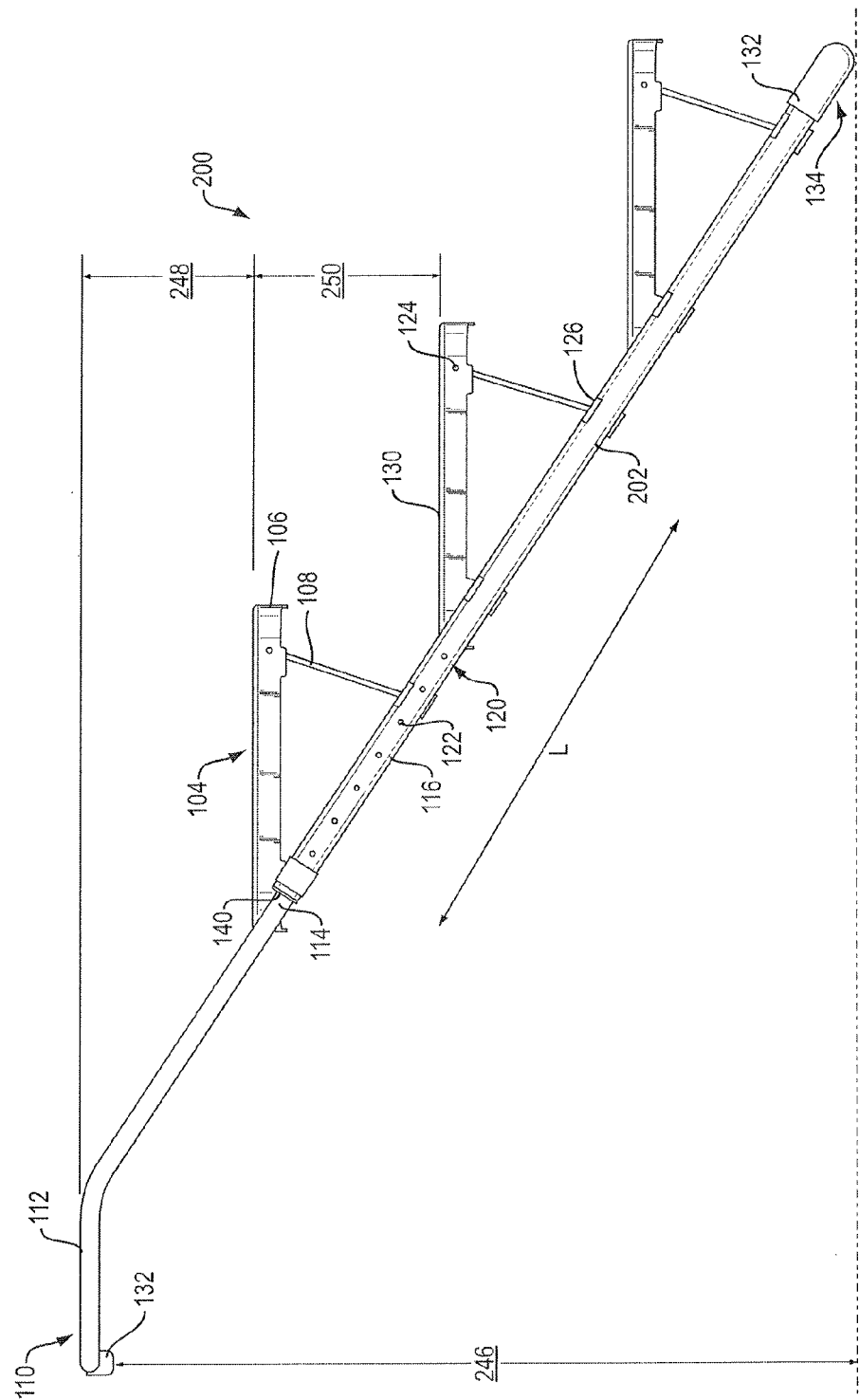

FIGS. 10A and 10B are side views of exemplary ramp/step device 200 in a non-extended and an extended configuration, respectively. In particular, FIGS. 10A and 10B illustrate the differences in height between the non-extended and extended configurations of the ramp/step device 200. For example, in one embodiment, the height 246 of the non-extended ramp/step device 200 can be about 21.25 inches, while the height 246 of the extended ramp/step device 200 can be about 26.21 inches. It should be understood that in other embodiments, the height 246 of the ramp/step device 200 can be a variety of dimensions based on, e.g., the number of platform members 104 being implemented, the distance between the platform members 104 due to the size of the pet, and the like. While intermediate extensions of the handle connection section 114 are possible, i.e., extensions between the non-extended position and the fully extended position, a full extension of the handle connection section 114 extends the height 246 of the non-extended ramp/step device 200 by an extension height 248. As would be understood by those of ordinary skill in the art, the extension height 248 is substantially equal to the platform-to-platform height 250. Thus, a fully extended telescoping handle 110, i.e., the second frame section, can be substantially equivalent to an addition of a platform member 104 to the ramp/step device 200, i.e., the surface upon which the support section 132 is positioned acts as an additional platform member 104. The wide selection of extension heights offers the user flexibility, efficiency and simplicity in implementing the ramp/step device 200 in a variety of locations.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A pet ramp/step device, comprising:
    a frame having a first frame section and a handle section, the first frame section including first and second frame connection sections on opposing sides of the first frame section, the handle section being moveable with respect to the first frame section to adjust a length of the frame; and
    a first platform member operatively coupled to the first frame section, the first platform member being moveable with respect to the first frame section between a step position and a ramp position;
    wherein a distance between the first and second frame connection sections defines a width of the frame;
    wherein the first frame section extends linearly along a longitudinal axis of the frame; and
    wherein a first portion of the handle section extends linearly from the first and second frame connection sections in a direction parallel to the longitudinal axis and the first frame section such that the first frame section and the first portion reside in a plane defined along the longitudinal axis, and a second portion of the handle section defining a distal end of the handle section extends laterally along the width of the frame in a direction perpendicular to the longitudinal axis, the second portion of the handle section extending from the first portion at an angle relative to the plane including the first frame section and the first portion and extending parallel to a runner of the first platform member when the first platform member is moved into the step position.

2. The device of claim 1, wherein the frame includes a frame hinge that facilitates folding the frame into a folded position.

3. The device of claim 2, wherein the frame includes a frame locking mechanism that facilitates locking the frame in the folded position.

4. The device of claim 1, wherein the handle section includes at least two hooks detachably secured relative thereto.

5. The device of claim 1, wherein the handle section includes a handle locking mechanism configured and dimensioned to releasably secure the handle section relative to at least one of the first and second frame connection sections.

6. The device of claim 5, wherein the handle locking mechanism is a spring-loaded lock button or detent.

7. The device of claim 6, wherein at least one of the first and second frame connection sections includes a plurality of apertures or holes configured and dimensioned to releasably receive the spring-loaded lock button or detent.

8. The device of claim 1, wherein the first platform member comprises a riser and the runner, and the first platform member is movably mounted with respect to the first frame section.

9. The device of claim 8, wherein the runner is movably mounted relative to the first frame section by a runner hinge and the riser is movably mounted relative to the runner by a riser hinge.

10. The device of claim 8, wherein the frame includes a pair of riser supports associated with the first platform member, the riser is fixedly supported by the pair of riser supports and the runner is supported by the riser when the first platform member is moved into the step position, and the runner is supported by the pair of riser supports when the first platform member is moved into the ramp position.

11. The device of claim 8, wherein the runner is configured and dimensioned to receive the riser when the first platform member is moved into the ramp position.

12. The device of claim 8, wherein the runner is adapted to releasably lock to the first frame section when the first platform member is moved into the ramp position.

13. The device of claim 8, wherein the runner of the first platform member includes a textured surface.

14. The device of claim 1, wherein an angle between the first frame section and the second portion of the handle section is fixed.

15. The device of claim 1, wherein the first portion is a linear portion of the handle section and the second portion is an angled portion of the handle section, and wherein the linear portion of the handle section is a handle connection section and the angled portion of the handle section is a support section.

16. The device of claim 15, wherein the support section of the handle section is configured and dimensioned to be positioned against a supporting structure.

17. The device of claim 16, wherein the handle connection section of the handle section is extendable relative to the first and second frame connection sections of the first frame section based on a height of the supporting structure.

18. The device of claim 15, wherein the handle connection section is configured and dimensioned to translate within the first and second frame connection sections of the first frame section.

19. The device of claim 1, wherein the handle section is devoid of a platform member.

20. The device of claim 1, wherein the handle section is movable with respect to the first frame section in discrete increments.

21. The device of claim 1, wherein the second portion of the handle section extends away from the longitudinal axis.

22. The device of claim 1, wherein the handle section extends longitudinally from a proximal end of the first frame section and the frame further comprises a second frame section extending from a distal end of the first frame section.

23. The device of claim 22, wherein the first frame section is rotatably coupled to the second frame section to adjust an orientation of the second frame section relative to the first frame section.

24. The device of claim 23, further comprising a second platform member operatively coupled to the second frame section.

25. The device of claim 1, wherein a position of the first platform member is adjustably coupled to the first frame section along the plane defined along the longitudinal axis.

* * * * *